United States Patent [19]
Overby

[11] Patent Number: 5,351,575
[45] Date of Patent: Oct. 4, 1994

[54] PUMPING PROPULSION SYSTEM

[76] Inventor: Nathan Overby, 7200 Vincent Ave. S., Richfield, Minn. 55423

[21] Appl. No.: 70,552

[22] Filed: Jun. 1, 1993

Related U.S. Application Data

[63] Continuation-in-part of Ser. No. 21,757, Feb. 24, 1993.

[51] Int. Cl.⁵ .............................................. G05G 1/14
[52] U.S. Cl. .................... 74/594.2; 74/584.1; 74/143; 280/257
[58] Field of Search ............... 74/143, 594.1–594.7; 280/256, 257, 279, 260; 440/26, 13, 21, 25; 267/171; 384/545, 512

[56] References Cited

U.S. PATENT DOCUMENTS

| | | | |
|---|---|---|---|
| 564,948 | 7/1896 | Stover | 74/143 |
| 600,450 | 3/1898 | Richmond et al. | 74/534.2 X |
| 608,674 | 8/1898 | Harshner | 280/257 |
| 617,390 | 1/1899 | Beebe | 280/257 |
| 740,156 | 9/1903 | Mendenhall | 74/143 |
| 1,330,011 | 3/1920 | Russo | 280/257 |
| 1,477,544 | 12/1923 | D'Antonio | 280/257 |
| 1,566,669 | 12/1925 | Greene | 280/257 |
| 1,571,562 | 2/1926 | Tingley | 280/257 |
| 1,667,940 | 5/1928 | Life | 280/257 |
| 2,184,244 | 12/1939 | Meyer | 280/257 |
| 3,184,020 | 6/1965 | Benson et al. | 192/45 |
| 3,194,368 | 7/1965 | Benson et al. | 192/45 |
| 3,241,641 | 3/1966 | Cowles | 192/45 |
| 3,339,687 | 9/1967 | Cowles | 192/45 |
| 3,404,760 | 10/1968 | Benson et al. | 192/45 |
| 3,528,534 | 9/1970 | Benson et al. | 192/45 |
| 3,937,311 | 2/1976 | Gehrke | 192/45 |
| 3,937,312 | 2/1976 | Gehrke | 192/45 |
| 3,942,616 | 3/1976 | Elmore | 192/45 |
| 4,456,276 | 6/1984 | Bortolin | 280/257 |
| 4,564,206 | 1/1986 | Lenhardt | 74/143 X |
| 5,088,340 | 2/1992 | Seol | 74/143 |
| 5,172,926 | 12/1992 | Mannino | 280/256 X |
| 5,226,674 | 7/1993 | Buell et al. | 280/284 |

*Primary Examiner*—Vinh T. Luong
*Attorney, Agent, or Firm*—Palmatier, Sjoquist & Helget

[57] ABSTRACT

The pumping propulsion system relates to a new drive and/or power system for a bicycle/vehicle. Power is applied to the pumping propulsion system by a stepping action from an individual's legs and feet. The pumping propulsion system operates by use of independent drawn cup roller clutch mechanisms which are integral to a pair of support members and a sprocket which in turn are engaged to a shaft. The drawn cup roller clutch mechanisms permit the pair of support members to be returned to an elevated position by a spring mechanism. During operation of the pumping propulsion system, the stepping action by an individual rotates a sprocket which is engaged to a shaft. The shaft is engaged to the hub of the bicycle frame. The rotation of the sprocket circulates the chain, transferring power to the rear wheel propelling the bicycle/vehicle.

21 Claims, 8 Drawing Sheets

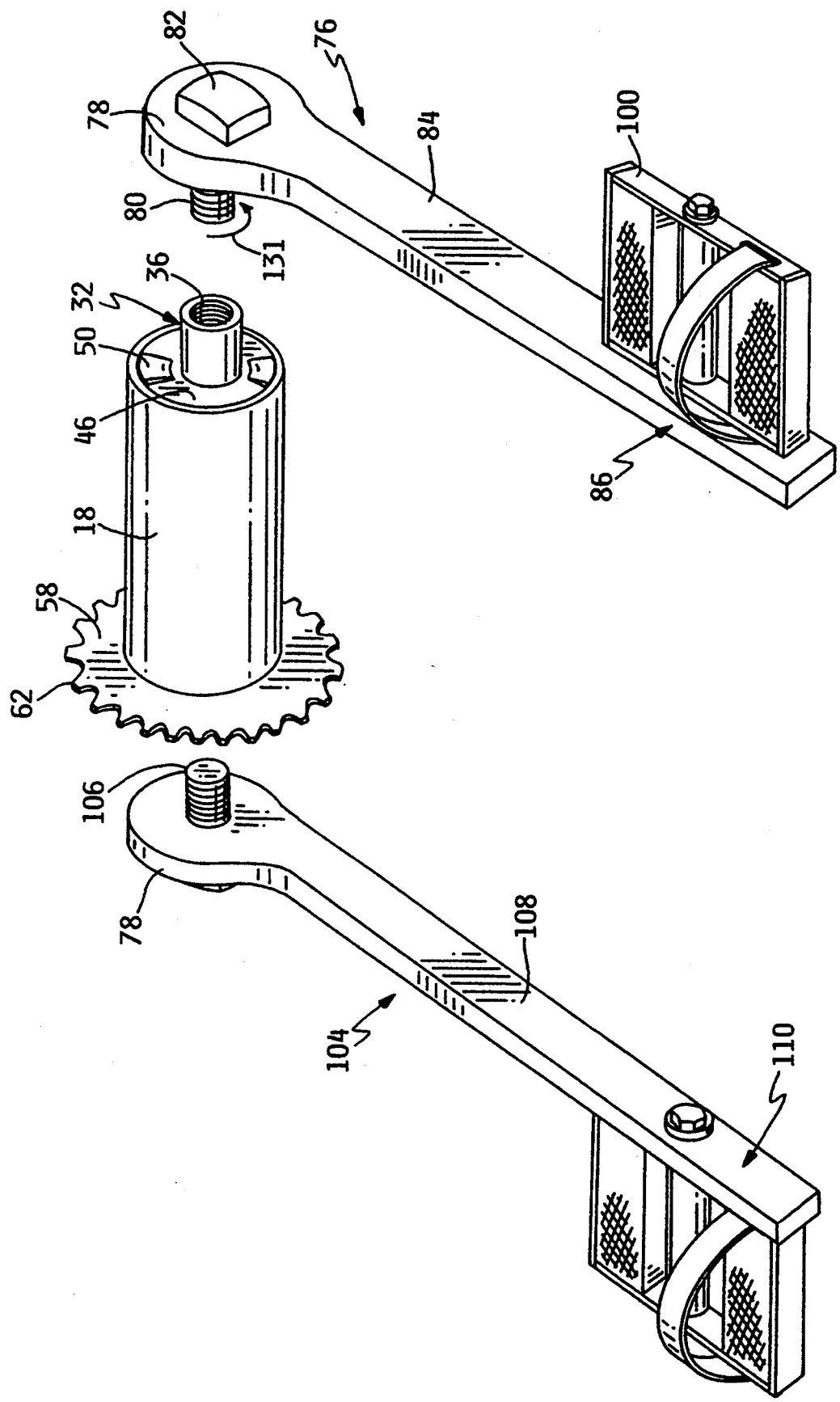

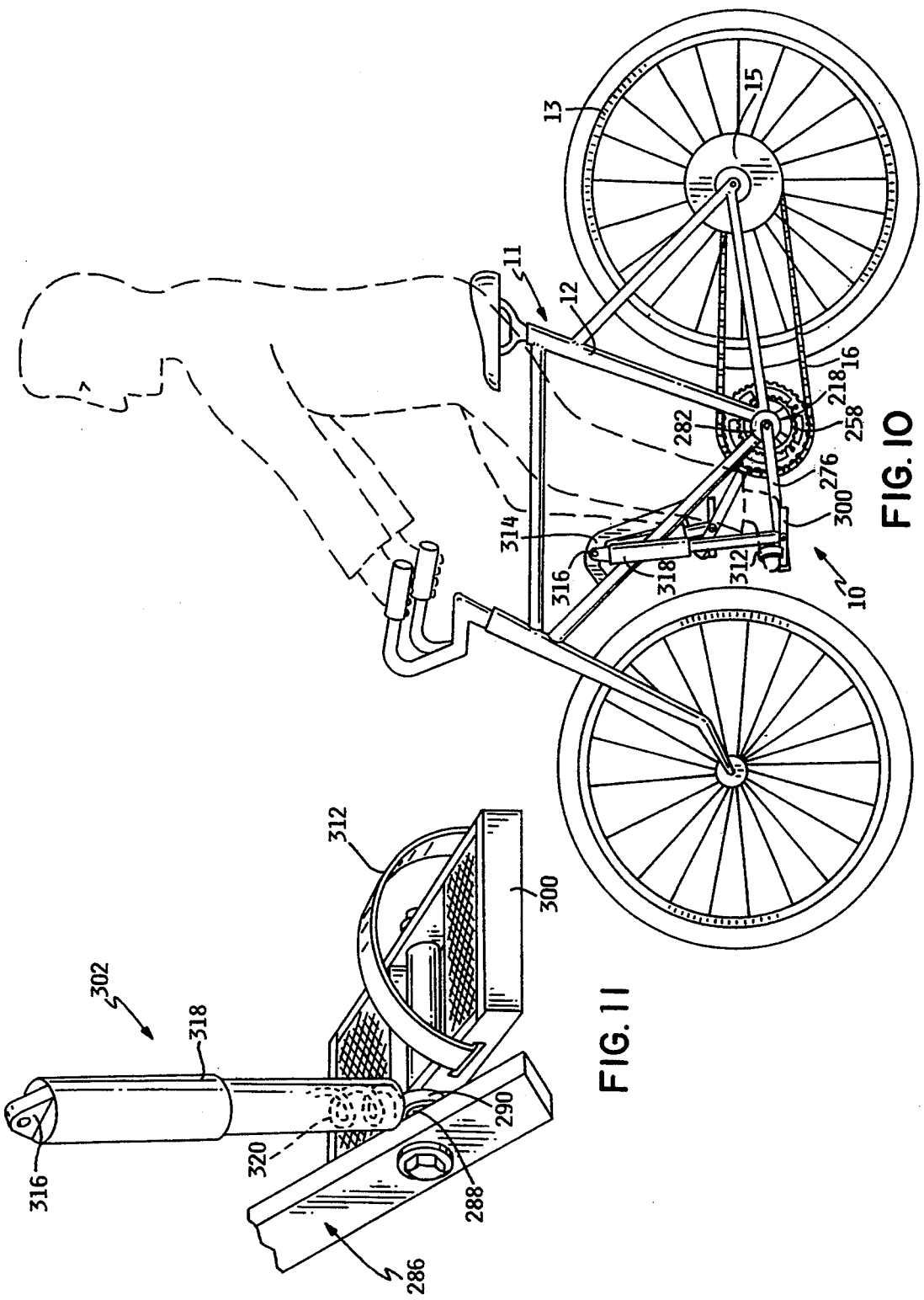

PUMPING PROPULSION SYSTEM

BACKGROUND OF THE INVENTION

This is a continuation-in-part application of co-owned U.S. patent application Ser. No. 08/021,757, filed Feb. 24, 1993 pending.

Manual propulsion systems for bicycles and/or vehicles typically include a drive sprocket, a chain, a derailer, various gear sprockets, and peddles. In the past, an individual has been required to operate a bicycle/vehicle by peddling the drive sprocket in a circular action. In addition, the two pedals of a bicycle/vehicle are usually rigidly affixed to opposite sides of the drive sprocket and are operated in a dependent fashion with respect to one another. An individual operating a bicycle/vehicle is generally not provided with the ability to vary the stroke action of his/her legs. The individual is also not able to operate his/her legs independently of one another during the propulsion of a bicycle/vehicle. The present invention provides an alternative stroke action for an individual's legs during the engagement of a propulsion system for a bicycle/vehicle. In addition, the present invention allows an individual to operate his/her legs independently of one another during the operation of a bicycle/vehicle.

SUMMARY OF THE INVENTION

The invention relates to a new drive and/or power system for a bicycle/vehicle. The invention includes a pumping propulsion system for use by an individual. Power is applied to the pumping propulsion system by a stepping action from an individual's legs and feet. The pumping propulsion system operates by use of independent drawn cup roller clutch mechanisms which are integral to a pair of support members and a sprocket which in turn are engaged to a shaft. The drawn cup roller clutch mechanisms permit the pair of support members to be returned to an elevated position by a means for actuating which may include a spring mechanism. During operation of the pumping propulsion system, the stepping action by an individual rotates a sprocket which is engaged to a shaft. The shaft is engaged to the hub of the bicycle frame. The rotation of the sprocket circulates the chain, transferring power to the rear wheel propelling the bicycle/vehicle.

It is a principal object of the present invention to provide a new and improved pumping propulsion system for a bicycle/vehicle of relatively simple and inexpensive design, construction, and operation, which is safe and durable and which fulfills the intended purpose without fear of injury to persons and/or damage to property.

It is another object of the present invention to provide a pumping propulsion system which allows an individual to engage in a stepping action on pedals in order to propel a bicycle/vehicle.

still another object of the present invention is to provide a pumping propulsion system which permits and individual to operate his/her legs independently of one another during the propulsion of a bicycle/vehicle.

Still another object of the present invention is to provide a pumping propulsion system for a bicycle/vehicle which functions with existing and/or known bicycle chains, gear sprockets, and derailers without the necessity for modification of, and/or adjustment to, these elements.

Still another object of the present invention is to provide a mechanism for the smooth pumping of an individual's legs during operation of the pumping propulsion system of a bicycle/vehicle.

A feature of the present invention is a shaft which traverses, and is freely rotatable within, the hub of a bicycle/vehicle.

Another feature of the present invention includes a means for facilitating the rotation of the shaft, which may include circular bearings which are engaged to the shaft and to the interior of the hub, permitting free rotation of the shaft within the hub.

Still another feature of the present invention is a threaded screw-in adapter and a reverse threaded screw-in adapter which affix the shaft and bearings to the hub.

Still another feature of the present invention is a first support member having a drawn cup roller clutch mechanism which is engaged to the shaft.

Still another feature of the present invention is a second support member having a drawn cup roller clutch mechanism which is engaged to the shaft.

Still another feature of the present invention is a pedal pivotally affixed to the first and second support members.

Still another feature of the present invention ms a means for actuating the first and second support members which is pivotally engaged to the frame of a bicycle, and affixed to each of the first and second support members, where the means for actuating return the pedals to an elevated position.

Still another feature of the present invention is a sprocket having a drawn cup roller clutch mechanism engaged a shaft for propelling of a bicycle/vehicle.

Still another feature of the present invention is a second means for affixing the first and second support members to the shaft which may include threaded and reverse threaded bolts.

BRIEF DESCRIPTION OF THE DRAWINGS

FIGS. 1–5 show the first embodiment of the pumping propulsion system and FIGS. 7–11 show the second embodiment of the invention FIG. 1 is an isometric view of the invention engaged to a bicycle.

FIG. 2 is a partial exploded view of the invention showing pedals, support members, a free wheel sprocket, a Lock washer, screw-in adapters, bearing means, a shaft, and a hub.

FIG. 3 is a detailed view of the spring means.

FIG. 4 is a partial isometric view of the invention showing pedals, support members, a free wheel sprocket, a shaft, and a hub.

FIG. 5 is a cross-section view of the free wheel sprocket taken along the line of 5—5 of FIG. 2.

FIG. 7 is a partial exploded view of the invention showing pedals, support members, sprocket, first means for affixation, second means for affixation, and drawn cup roller clutch mechanisms.

FIG. 8 is a cross-section view of the drawn cup roller clutch mechanism taken along the lines of 8—8 of FIG. 7.

FIG. 9 is a partial isometric view of the invention showing pedals, support members, sprocket, shaft, and a hub.

FIG. 10 is an isometric view of the invention engaged to a bicycle.

FIG. 11 is a detailed view of the means for actuating.

DETAILED SPECIFICATION OF THE PREFERRED EMBODIMENT

Figure 1:
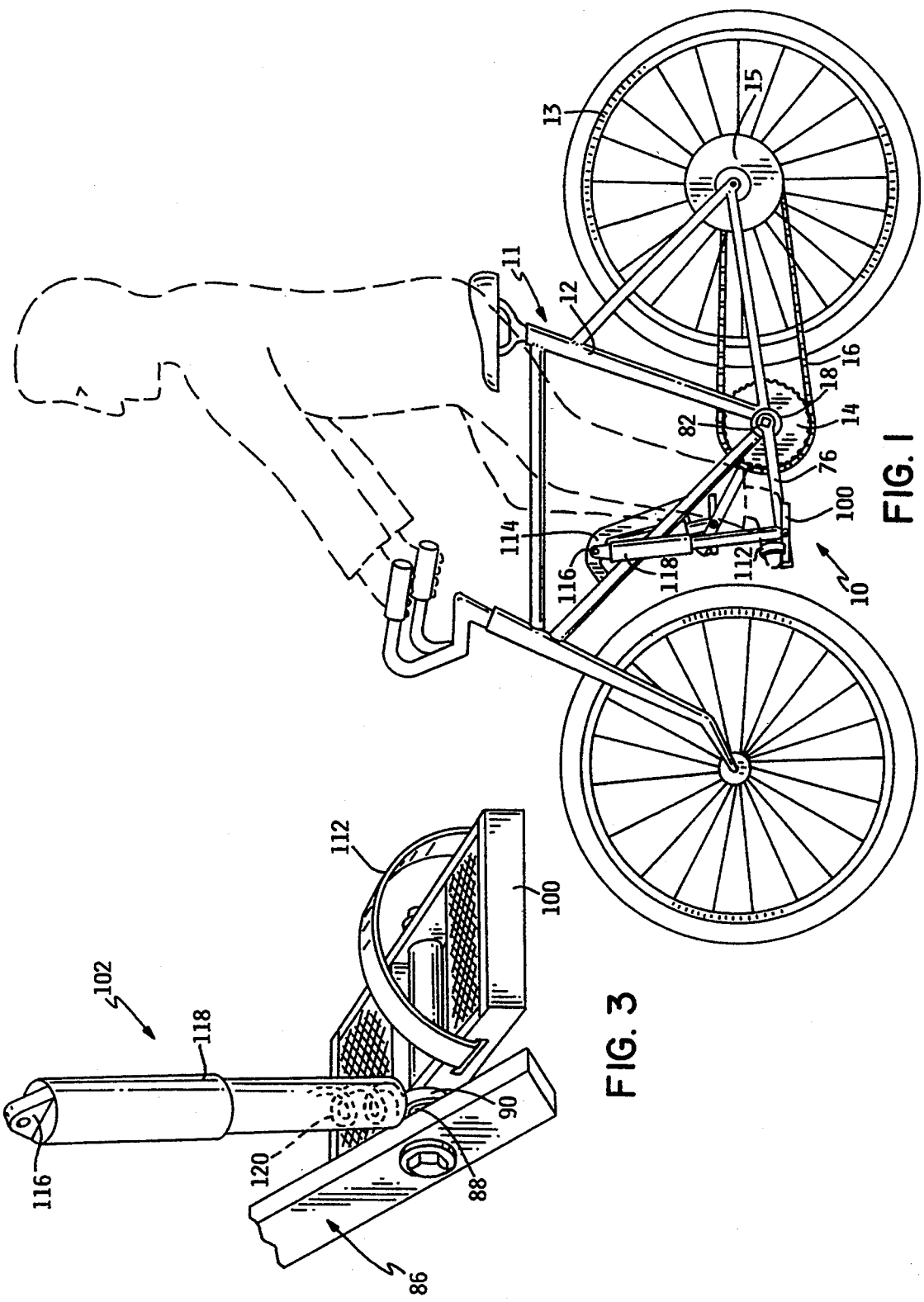

The manual pumping propulsion system is described herein. The pumping propulsion system in general is indicated by the numeral 10. In the preferred embodiment, the pumping propulsion system 10 is used in conjunction with a bicycle 11 having a frame 12, a rear wheel 13, a drive sprocket 14, various gears 15, and a bicycle chain 16. (FIG. 1) The pumping propulsion system 10 may also be used to manually propel two, three, or four wheeled vehicles and/or manually powered vessels such as paddle boats.

Figure 2:
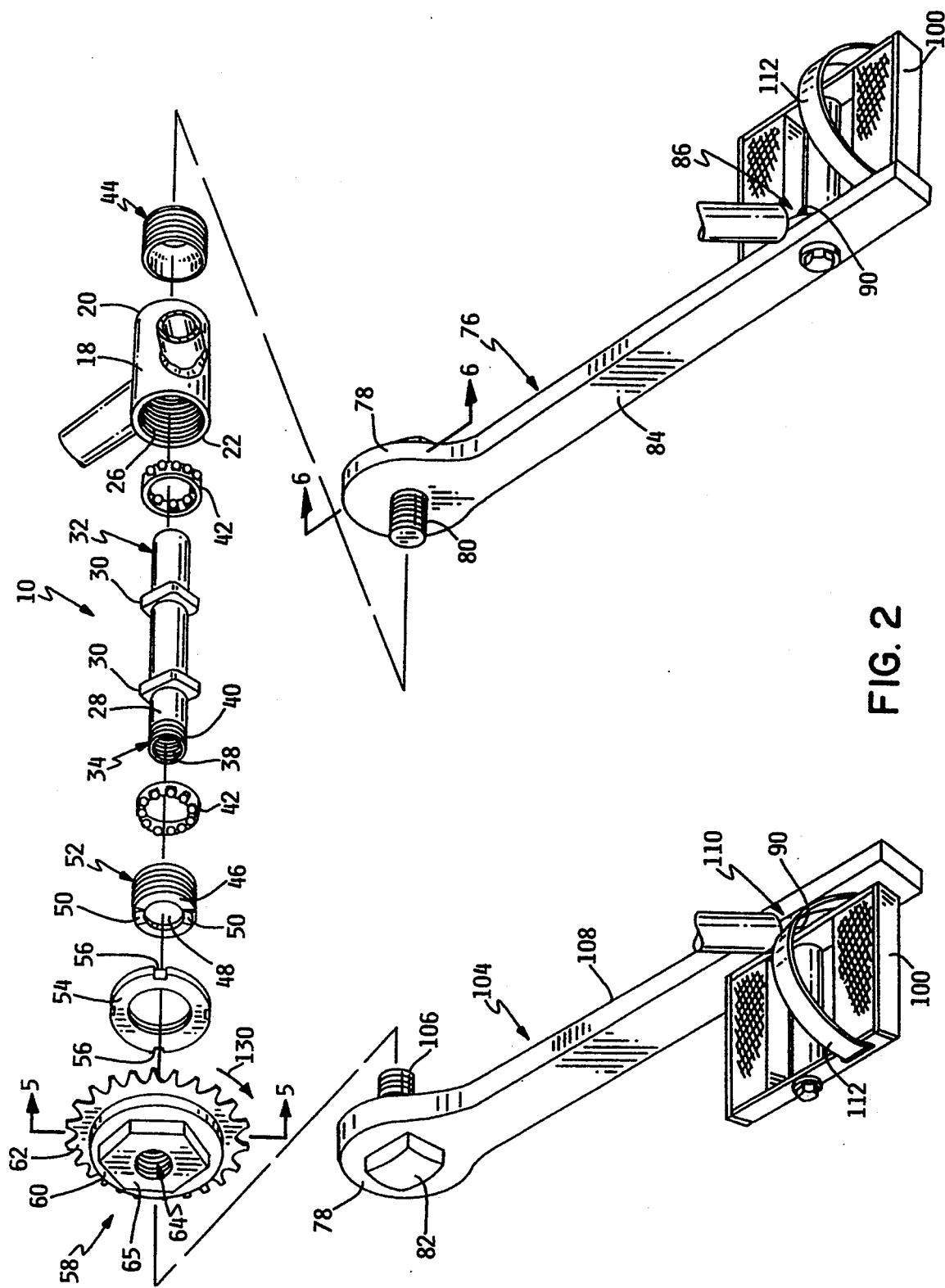

In the preferred embodiment, the pumping propulsion system 10 is engaged to a hub 18 of a bicycle 11. The hub 18 is generally positioned proximal to the feet of a rider, equal distances between the two wheels of bicycle 11. The hub 18 is generally integral to the frame 11 and is tubular in shape. (FIG. 1) The hub 18 has an interior, a first end 20, and a second end 22. The interior of the first end 20 of the hub 18 has a first reverse threaded receiving surface. The interior of the second end 22 of the hub 18 has a first threaded receiving surface 26. In addition, the interior of the hub 18 has a central non-threaded portion located equal distances between the first end 20 and the second end 22. (FIG. 2)

The pumping propulsion system 10 is engaged to the hub 18, which in turn is integral to the frame 12 of the bicycle 11. Thus, the hub 18 holds and affixes the pumping propulsion system 10 to the bicycle 11 during use.

A shaft 28 traverses the interior of the hub 18. The shaft 28 is preferably formed of a solid, sturdy metallic material and is cylindrical in shape. The diameter of the shaft 28 is preferably 9/16 inch. The length of the shaft 28 is preferably six inches. The diameter and length dimensions of the shaft 28 may be varied to satisfy the operational requirements of a vehicle/vessel. The described dimensions are provided for illustrative purposes to show one of the many varied forms for which the invention may take. The dimensions of the hub 18 and shaft 28 may very considerably provided the essential attributes and features described herein are not sacrificed. (FIG. 2)

The shaft 28 has a pair of flanges 30 which are preferably square, hexagonal, or octagonal in shape. The flanges 30 are preferably located centrally, equal distances between the first end 32 and the second end 34 of the shaft 28. The flanges 30 are preferably positioned proximal to the central non-threaded portion of the interior of the hub 18. (FIG. 2)

The first end 32 of the shaft 28 has a machined second reverse threaded receiving surface 36. (FIG. 4) The second end 34 of shaft 28 has a machined second interior threaded receiving surface 38. The second end 34 also has a second exterior threaded penetrating surface 40. The shaft 28 freely rotates within the interior of the hub 18. However, during engagement of the pumping propulsion system 10, the shaft rotates in only one direction. The direction of rotation, as a reference, shall be indicated herein as a clockwise rotation as apparent from arrow 130 of FIG. 2.

The purpose of the shaft 28 is to provide a portion of the mechanism for the transfer of manual power to a bicycle/vehicle during use of the pumping propulsion system 10. The shaft 28 rotates within the hub 18, transferring power to the chain 16, gears 15, and ultimately to the rear wheel 13 of the bicycle/vehicle 11.

The flanges 30 provide an individual with a surface for grasping during the assembly, disassembly, and/or maintenance of the pumping propulsion system 10. An individual, upon grasping of the flanges 30 with a tool, may rotate the shaft 28 in a desired direction.

The purpose of the second reverse threaded receiving surface 36 of the first end 32 of the shaft 28 is to engage the penetrating reverse threaded member 80 of the first support member 76. (FIG. 4)

The purpose of the second interior threaded receiving surface 38 of the second end 34 of the shaft 28 is to engage the penetrating threaded member 106 of the second support member 104. (FIG. 2)

During operation of the pumping propulsion system 10, the first and second support members 76 and 104, respectively, transfer power from the pumping/stepping action of a rider's legs to rotate the shaft 28 in a clockwise direction.

The purpose of the second exterior threaded penetrating surface 40 of the second end 34 of the shaft 28 is to engage the free wheel sprocket 58. Power generated during rotation of the shaft 28 is then transferred from the shaft 28 to the free wheel sprocket 58, then to chain 16, gears 15, and ultimately to the rear wheel 13 for propulsion of the bicycle/vehicle 11. (FIG. 2)

A pair of bearing means 42 are engaged to the shaft 28 and the hub 18 of the pumping propulsion system 10. One bearing means 42 is positioned between one flange 30 and the first end 32 of shaft 28. The other bearing means 42 is positioned between the other flange 30 and the second end 34 of the shaft 28. Each bearing means 42 has a circular housing having a bore and a plurality of ball bearings. The shaft, 28 is flushly engaged to, and encircled by, the bore of the circular housing of each of the bearing means 42. Each of the bearing means 42 is preferably engaged to the shaft 28 proximal to the flanges 30, and is positioned proximal to the non-threaded portion of the interior of the hub 18. The purpose of the bearing means 42 is reduce friction and provide free rotation of the shaft 28, within the interior of the hub 18. (FIG. 2)

A first reverse threaded screw-in adapter 44 is engaged to the first end 20 of the hub 18. The first reverse threaded screw-in adapter 44 is preferably cylindrical in shape having two ends, a platform 46 engaged to one end, and a circular aperture 48 passing through the platform 46. The platform 46 also contains a pair of tightening members 50. The exterior of the first reverse threaded screw-in adapter 44 is machined for screw-in engagement to the first reverse threaded receiving surface of the first end 20 of the hub 18. The first end 32 of the shaft 28 passes through the circular aperture 48 of the platform 46. The first reverse threaded screw-in adapter 44 may then be affixed to the first reverse threaded receiving surface of the first end 20 of the hub 18. (FIGS. 2 and 4)

A purpose of the first reverse threaded screw-in adapter 44 is to confine the bearing means 42 to the interior of the hub 18. Another purpose of the first reverse threaded screw-in adapter 44 is to confine the bearing means in an encircling relationship around the shaft 28 in order to reduce friction, and maintain free rotation of the shaft 28 in the hub 18. Still another purpose of the first reverse threaded screw-in adapter 44 is affix the shaft 28 to the hub 18.

A second threaded screw-in adapter 52 is engaged to the second end 22 of the hub 18. The second threaded screw-in adapter 52 is preferably cylindrical in shape having two ends, a platform 46 engaged to one end, and a circular aperture 48 passing through the platform 46. The platform 46 also contains a pair of tightening members 50. The exterior of the second threaded screw-in adapter 52 is machined for screw-in engagement to the first threaded receiving surface 26 of the second end 22 of the hub 18. The second end 34 of the shaft 28 passes through the circular aperture 48 of the platform 46. The second threaded screw-in adapter 52 may then be affixed to the first threaded receiving surface 26 of the second end 22 of the hub 18 by clockwise rotation of the second threaded screw-in adapter 52 in the direction of arrow 130 of FIG. 2.

A purpose of the second threaded screw-in adapter 52 is to confine the bearing means 42 to the interior of the hub 18. Another purpose of the second threaded screw-in adapter 52 is to confine the bearing means in an encircling relationship around the shaft 28 in order to reduce friction, and maintain free rotation of the shaft 28 in the hub 18. Still another purpose of the second threaded screw-in adapter 52 is to affix the shaft 28 to the hub 18.

It should be noted that the platforms 46 of the first reverse threaded screw-in adapter 44 and the second threaded screw-in adapter 52 are positioned to the exterior of the hub 18. The tightening members 50 may then be easily manipulated by an individual during assembly, disassembly, or maintenance of the pumping propulsion system 10. (FIGS. 2 and 4)

A lock washer 54 is engaged to the second threaded screw-in adapter 52. The lock washer 54 has a circular threaded interior which engages the threaded exterior of second threaded screw-in adapter 52. The lock washer 54 also has a plurality of notches 56 to provide an individual with a surface for grasping during the assembly, disassembly, and/or maintenance of the pumping propulsion system 10. A purpose of the lock washer 54 is to rigidly affix the second screw-in adapter 52 to the hub 18. Another purpose of the lock washer 54 is to securely position the interior of the free wheel sprocket 58, and separate the free wheel sprocket 58, from the second screw-in adapter 52 and the hub 18. (FIG. 2)

In the preferred embodiment, a free wheel sprocket 58 is engaged to the second exterior threaded penetrating surface 40 of the second end 34 of the shaft 28. The free wheel sprocket 58 is generally cylindrical in shape. The free wheel sprocket 58 has a body 60 holding a roller mechanism having a hub sleeve 66, drive rollers 68, a roller guide ring 70, and a ratchet mechanism 72. A threaded circular aperture 64 centrally passes through the body 60 of the free wheel sprocket 58. A tooth member 62 is engaged to the hub sleeve 66 and to the roller mechanism as known in the art. The tooth member 62 is engaged to the bicycle chain 16 during operation of the pumping propulsion system 10. (FIGS. 2 and 5) As known in the art, the roller mechanism of the free wheel sprocket 58 rigidly affixes the position of the body 60 with respect to the tooth member 62 during the clockwise rotation of the body 60, when the speed of rotation of the shaft 28 and the tooth member 62 exceed the speed of rotation of the gears 15 of the rear wheel 13. The roller mechanism provides the free rotation of the tooth member 62, relative to the body 60, when the speed of rotation of the gears 15, rear wheel 13, and chain 16 exceed the speed of rotation of the shaft 28 and the body 60.

A handle nut 65 is located on the exterior of the body 60 of the free wheel sprocket 58. The handle nut 65 may be square, hexagonal, or octagonal in shape for grasping by an individual during assembly, disassembly, and/or maintenance of the pumping propulsion system 10. (FIG. 2)

The free wheel sprocket 58 is engaged to the second exterior threaded penetrating surface 40 of the second end 34 of the shaft 28. The threaded circular aperture 64 is preferably screwed, in a clockwise direction, onto the second exterior penetrating surface 40 of the shaft 28 in the direction indicated by arrow 130 of FIG. 2.

During operation of the pumping propulsion system 10, the tooth member 62 is rigidly engaged to the body 60 of the free wheel sprocket 58 during clockwise rotation of the shaft 28, so long as the speed of rotation of the shaft 28 exceeds the speed of rotation of the axle for the rear wheel 13. The chain 16 is then rotated in a clockwise direction providing power to the gears 15 for the rotation of the rear wheel 13, propelling the bicycle/vehicle 11 in a forward direction. A bicycle/vehicle 11 may be backed or moved in a rearward direction which causes a counterclockwise rotation of the ratchet mechanism of the first support member 76 and the second support member 104. The free rotation of the ratchet mechanism of the first and second support members 76 and 104, respectively, permits the counterclockwise rotation of the shaft 28, which in turn permits the counterclockwise rotation of the chain 16 and the rear wheel 13, allowing rearward movement of the bicycle/vehicle 11.

During use of the pumping propulsion system 10, the shaft 28 and the free wheel sprocket 58, are rotatable in either a clockwise or counterclockwise direction. The shaft 28 and the body 60 remain in a static or stationary position during the rolling of a bicycle 11 in a forward direction, due to the ability of the tooth member 62 to freely rotate in a clockwise direction when the speed of the rotation of the axle of the rear wheel 13 exceeds the speed of rotation of the shaft 28.

Figure 5:
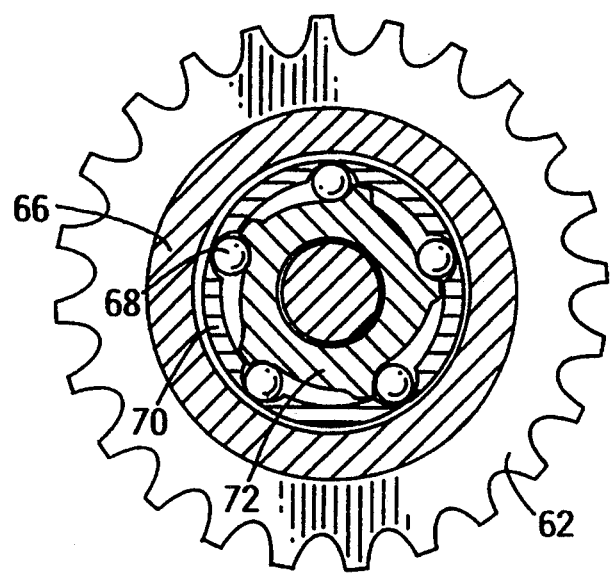

The purpose of the free wheel sprocket 58 is to provide the mechanism for the transfer of power from clockwise rotation of the shaft 28 to the bicycle chain 16 for propulsion of the bicycle/vehicle 11. Another purpose of the free wheel sprocket 58 is to provide for the free clockwise rotation of the tooth member 62, bicycle chain 16, gears 15, and/or rear wheel 13, when a bicycle/vehicle 11 is coasting or moved in a forward direction. The free wheel sprocket 58 performs a function of transferring power, via the chain 16, to the rear wheel 13 during the pumping of the peddles 100. Another function of the free wheel sprocket 58 is to provide free clockwise rotation of the tooth member 62 when the pedals 100 are at rest. As known in the art, these functions are performed by bringing a series of drive rollers 68 into contact with a rotating cylinder or hub sleeve 66 and by releasing them, respectively. The drive rollers 68 are disposed inside a guide ring 70. The shaft 28 is affixed to a special ratchet 72 which is so designed that when the pedals 100 are pumped, the sloped faces of the ratchet 72 bear against the rollers 68, so that the rollers 68 are jammed between the ratchet 72 and a hub sleeve 66. In this way, power is transmitted through the rollers 68 to the hub sleeve 66, which in turn is affixed to the tooth member 62. The tooth member 62 is engaged to the rear wheel 13 via a chain 16 which drives the vehicle/bicycle 11 in a forward direction. When coasting or free wheeling, the ratchet 72 remains stationary while the rear wheel 13 continues to rotate. The rollers 68 are then in the depressions formed in the surface of the ratchet 72 and are no longer jammed against the hub sleeve 66. The hub sleeve 66 and the tooth member 62 are thus able to rotate freely in a clockwise direction with respect to the ratchet 72. (FIG. 5)

The first support member 76 is engaged to the first end 32 of the shaft 28. The first support member 76 has a housing 78, an internal ratchet mechanism, a penetrating reverse threaded member 80, an engagement nut 82, a first leg 84 having a first lower portion 86, a peddle brace 88, and a spring bracket 90. (FIGS. 2, 3 and 4)

Figure 6:
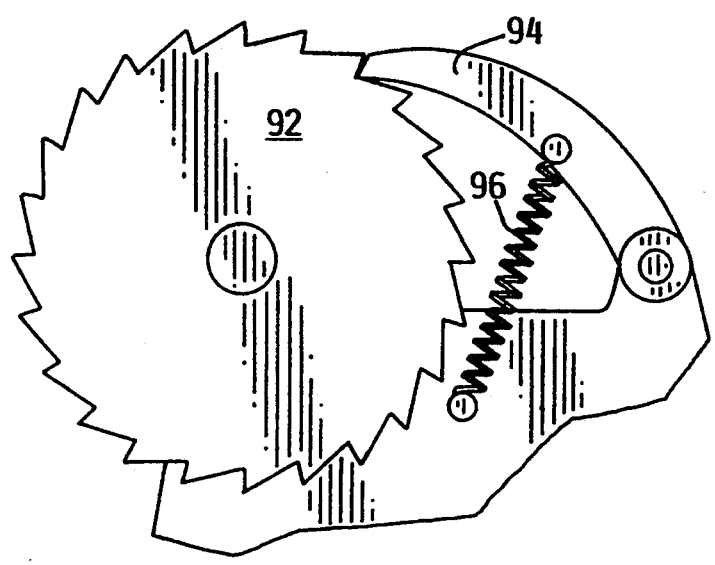
FIG. 6 is a cross-section view of the ratchet mechanism of the first support member taken along the line of 6—6 of FIG. 2.

The housing 78 is preferably positioned proximal to the first end 20 of the hub 18 and is curved in shape. The housing 78 holds a ratchet mechanism consisting of a ratchet wheel 92, pawl 94, and a spring 96 as known in the art. (FIG. 6) However, the ratchet mechanism may be of any preferred known mechanical means having features including but not limited to swinging pawls and support stud; helical springs and a hole for a spring tang; V-belt sheave and pawl; eccentric rollers and spring; rack, gear, lever, and cross spring; conical plate, pin and threaded hub; drum and flat spring; and/or eccentric cam, disc, and elongated hole. The purpose of the housing 78 is to confine the internal ratchet mechanism for operation of the pumping propulsion system 10. The purpose of the ratchet mechanism is to provide intermittent rotation of the shaft 28 in a desired direction. The pawl 94 allows the ratchet wheel 92 to rotate in one direction only, preventing rotation in the opposite direction by engaging the teeth 98 of the ratchet wheel 92. In the preferred embodiment, the ratchet mechanism permits the ratchet wheel 90 to rotate freely in a counterclockwise direction which is opposite to the direction of rotation indicated by arrow 130 of FIG. 2. The ratchet mechanism is prevented from rotation in a clockwise direction due to the engagement of the teeth 98 of the ratchet wheel 92 to the pawl 94 during the pumping action of the first leg 84 by an individual. (FIGS. 2, 4 and 6)

The penetrating reverse threaded member 80 is preferably centrally positioned extending perpendicular from the interior side of the housing 78 of the first support member 76. The penetrating reverse threaded member 80 is an integral portion of the ratchet mechanism of the first support member 76. The penetrating reverse threaded member 80 is preferably centrally affixed to the ratchet wheel 92. The exterior surface of the entire penetrating reverse threaded member 80 is preferably machined forming a continuous groove adapted for engagement to the second reverse threaded receiving surface 36 of the first end 32 of the shaft 28. The penetrating reverse threaded member 80 is preferably rotated into the second reverse threaded receiving surface 36 until a tight engagement has occurred, and the housing 78 is positioned proximal to the first end 32 of the shaft 28. (FIGS. 2 and 4) A purpose of the penetrating reverse threaded member 80 is to securely fasten the first support member 76 to the first end 32 of the shaft 28. Another purpose of the penetrating reverse threaded member 80 is to provide the mechanism and/or engagement means for the transfer of power resulting from the pumping action of the first support member 76 to the shaft 28 during operation of the pumping propulsion system 10. Still another purpose of the penetrating reverse threaded member 80 is to provide the transition means permitting reverse rotation of the shaft, via the coupling to the ratchet wheel 92, which is freely rotatable in the reverse or counterclockwise direction which is opposite to the direction of rotation indicated by arrow 130 of FIG. 2.

During operation of the pumping propulsion system 10, the penetrating reverse threaded member 80 is tightly maintained to the first end 32 of the shaft 28. During pumping of the first leg 84, the penetrating reverse threaded member 80 is rotated in a counterclockwise direction as shown by arrow 131 of FIG. 4 when viewed from the exterior of the first support member 76. This rotation increases the torque between the penetrating reverse threaded member 80 and the second reverse threaded receiving surface 36 of the first end 32 of the shaft 28. Tightening of the penetrating reverse threaded member 80 to the shaft 28 then occurs, necessitating rotation of the shaft 28 and the transfer of power to the free wheel sprocket 58. The friction exerted by the rear wheel 13 to the ground, or the ground to the rear wheel 13, counteracts, or results in a drag, upon the rotational forces exerted upon the free wheel sprocket 58. The drag forces resulting from friction continually necessitate a tight engagement between the penetrating reverse threaded member 80 and the second reverse threaded receiving surface 36 of the first end 32 of the shaft 28.

The engagement nut 82 is preferably centrally positioned on the exterior of, and extends from the housing 78, opposite to the penetrating reverse threaded member 80. The engagement nut 82 may be square, hexagonal, or octagonal in shape. The purpose of the engagement nut 82 is to provide an individual with a location for grasping of the first support member 76 during assembly, disassembly, and/or maintenance of the pumping propulsion system 10. (FIG. 4)

The first leg 84 is integrally formed to and depends from the housing 78 terminating in a first lower portion 86. The first leg 84 is preferably formed of a rigid metallic material of sufficient strength and durability to not fracture, break or bend during use of the pumping propulsion system 10. The first leg 84 may be of any length and is preferably twelve inches long. The purpose of the first leg 84 is to provide a sturdy, resilient support which does not bend or fracture when exposed to pumping forces exerted by an individual's legs during operation of the pumping propulsion system 10. (FIGS. 2 and 4).

A pedal brace 88 is affixed to and extends perpendicularly outward from the first lower portion 86 of the first leg 84. The pedal brace 88 pivotally affixes the pedal 100 to the first leg 84. The purpose of the pedal brace 88 is to provide for the pivotal engagement of the pedal 100 to the first support member 76. (FIG. 3)

A spring bracket 90 is affixed to and extends perpendicularly upward from the pedal brace 88. The spring bracket 90 attaches the spring means 102 to the first lower portion 86 of the first leg 84 of the first support member 76. (FIG. 3 )

The second support member 104 is engaged to the second end 34 of the shaft 28. The second support member 104 has a housing 78, an internal ratchet mechanism, a penetrating threaded member 106, an engagement nut 82, a second leg 108 having a second lower portion 110, a pedal brace 88, and a spring bracket 90. (FIGS. 2, 3 and 4)

The housing 78 of the second support member 104 is preferably positioned proximal to the second end 22 of the hub 18 and is curved in shape. The housing 78 holds a ratchet mechanism consisting of a ratchet wheel 92, pawl 94, and a spring 96 as earlier described for the first support member 76. The essential features of the ratchet mechanism of the second support member 104 are identical to the features of the first support member 76.

The purpose of the housing 78 of the second support member 104 is to confine the internal ratchet mechanism for operation of the pumping propulsion system 10. The purpose of the ratchet mechanism is to provide intermittent rotation of the shaft 28 in the desired direction. The pawl 94 allows the ratchet wheel 92 to rotate in one direction only, preventing rotation in the opposite direction by engaging the teeth 98 of the ratchet wheel 92. In the preferred embodiment, the ratchet mechanism of the second support member 104 permits the ratchet wheel 92 to rotate freely in a counterclockwise direction which is opposite to the direction indicated by arrow 130 of FIG. 2. The ratchet mechanism is prevented from rotation in a clockwise direction due to the engagement of the teeth 98 of the ratchet wheel 92 to the pawl 94 during pumping of the second leg 108 by an individual. (FIGS. 2 and 4)

The penetrating threaded member 106 is preferably centrally positioned extending perpendicular from the interior side of the housing 78 of the second support member 104. The penetrating threaded member 106 is an integral portion of the ratchet mechanism of the second support member 104. The penetrating threaded member 106 is preferably centrally affixed to the ratchet wheel 92. The exterior surface of the entire penetrating threaded member 106 is preferably machined forming a continuous groove adapted for engagement to the second interior threaded receiving surface 38 of the second. end 34 of the shaft 28. The penetrating threaded member 106 is preferably rotated into the second interior threaded receiving surface 38 until a tight engagement has occurred, and the housing 78 is positioned proximal to the second end 34 of the shaft 28. A purpose of the penetrating threaded member 106 is to securely fasten the second support member 104 to the second end 34 of the shaft 28. Another purpose of the penetrating threaded member 106 is provide the mechanism and/or engagement means for the transfer of power to the shaft 28 during operation of the pumping propulsion system 10. Still another purpose of the penetrating threaded member 106 is to provide the transition means permitting reverse rotation of the shaft 28 via the coupling to the ratchet wheel 92, which is freely rotatable in the reverse or counterclockwise direction which is opposite to the direction indicated by arrow 130 of FIG. 2.

During operation of the pumping propulsion system 10, the penetrating threaded member 106 is tightly maintained to the second end 34 of the shaft 28. During pumping of the second leg 108, the penetrating threaded member 106 is rotated in a clockwise direction as shown by arrow 130 of FIG. 2. This rotation increases the torque between the penetrating threaded member 106 and the second interior threaded surface 38 of the second end 34 of the shaft 28. Tightening of the penetrating threaded member 108 to the shaft 28 then occurs, necessitating rotation of the shaft 28 and transfer of power to the free wheel sprocket 58. The friction exerted by the rear wheel 13 to the ground, or ground to the rear wheel 13, counteracts, or results in a drag, upon the rotational forces exerted upon the free wheel sprocket 58. The drag forces continually necessitate a tight engagement between the penetrating threaded member 106 and the second interior threaded receiving surface 38 of the second end 34 of the shaft 28.

The engagement nut is 82 is preferably centrally positioned on the exterior of, and extends from the housing 78, opposite to the penetrating threaded member 106. The engagement nut 82 may be square, hexagonal, or octagonal in shape. The purpose of the engagement nut 82 is to provide an individual with a location for grasping of the second support member 104 during assembly, disassembly, and/or maintenance of the pumping propulsion system 10. (FIG. 2)

The second leg 108 is integrally formed to and depends from the housing 78 of the second support member 104 terminating in a second lower portion 110. The second leg 108 is preferably formed of a rigid metal material of sufficient strength and durability to not fracture, break or bend during use of the pumping propulsion system 10. The second leg 108 may be of any length and is preferably twelve inches long. The purpose of the second leg 108 is to provide a sturdy, resilient support which does not bend or fracture when exposed to pumping forces exerted by an individual's legs during operation of the pumping propulsion system 10. (FIG. 2)

A pedal brace 88 is affixed to an extends perpendicularly outward from the second lower portion 110 of the second leg 108. The pedal brace 88 pivotally affixes a pedal 100 to the second leg 108. The purpose of the pedal brace 88 is to provide for the pivotal engagement of the pedal 100 to the second support member 104.

A spring bracket 90 is affixed to an extends perpendicularly upward from the pedal brace 88. The spring bracket 90 attaches the spring means 102 to the second lower portion 110 of the second leg 108 of the second support member 104. (FIG. 3 )

A pedal 100 is pivotally affixed and extends outwardly from each of the pedal braces 88 of the first and second legs 84 and 108, respectively. The pedals 100 may be affixed to the pedal brace 88 of the first and second legs 84, 108 by any preferred means including but not limited to bolts and nuts. Each pedal 100 has a toe loop 112 as known in the art. The pedals 100 and toe loops 112 provide the area for engagement of an individual's feet during operation of the pumping propulsion system 10.

A spring means 102 is preferably engaged to each of the spring brackets 90. In general, the spring means 102 includes a platform 114 affixed to the frame 12 of the bicycle/vehicle 11, a pivot means 116 affixed to the platform 114, a pair of telescoping tubes 118, and a spring member 120 within each of the telescoping tubes 118. (FIGS. 1 and 3)

The platform 114 is preferably affixed to and extends upward from the frame 12 of the bicycle/vehicle 11. The platform 114 may be any preferred aesthetically pleasing shape including but not limited to a straight bar, inverted V-shape, and/or inverted U-shaped. The platform 114 may be affixed to the frame 12 by any preferred means including but not limited to welding, rivets, nuts and bolts, and/or glue at the preference of an individual. (FIG. 1)

A pivot means 116 is preferably engaged to the upper portion of the platform 114. The pivot means 116 is preferably a bolt and nut mechanism, which permits movement of the position of the telescoping tubes 118 during operation of the pumping propulsion system 10. (FIGS. 1 and 3)

Each of the pair of telescoping tubes 118 hold a spring member 120. One of the pair of telescoping tubes 118 is affixed to one side of the platform 114 and to the spring bracket 90 of the first support member 76. The other telescoping tube 118 is affixed to the opposite side of the platform 114 and to the spring bracket 90 of the second support member 104. The spring members 120 are affixed to the telescoping tube members 118 proximal to the pivot means 116 and proximal to the spring brackets 90.

The purpose of the platform 114 is to provide an upper support for the spring means 102. The purpose of the pivot means 116 is to provide for movement and adjustable positioning of the pair of telescoping tubes 118 during operation of the pumping propulsion system 10. The purpose of the pair of telescoping tubes 118 is to confine and protect spring members 120 during operation of the pumping propulsion system 10. The purpose of the spring members 120 is to return the pedals 100 and first and second support members 76, 104 to a static elevated position upon the removal of pumping force by an individual.

During operation of the pumping propulsion system 10, the torque forces exerted upon the first and second support members 76, 104 continuously tighten the engagement between the first and second support members 76, 104, free wheel sprocket 58 and shaft 28. The ratchet mechanisms of the first and second support members 76, 104 provide independent action between the first and second legs 84, 108. An individual may use a single leg to drive the pumping propulsion system 10 or the individual may use any combination of both legs to power a bicycle/vehicle 11. During operation, the first and second legs 84, 108 depend from a position proximal to the platform 114 to a position substantially horizontal to the hub 18. Further downward extension of the first and second legs 84, 108 is not possible due to the full expansion of the telescoping tubes 118 and spring members 120. The telescoping tubes 118 and spring members 120 may provide additional range of downward stroke to the legs at the preference of an individual. The purpose of the pumping propulsion system 10 is to provide to an individual an alternative stepping-type action for an individual's legs as opposed to the circular action for propelling a bicycle 11 as known in the art. The pumping propulsion system 10 significantly reduces the stress forces exerted upon an individual's knees, thereby significantly improving the utility of a bicycle/vehicle 11 to an individual.

Preferably the spring members 120 are of sufficient strength and durability to not fracture and/or stretch during use of the pumping propulsion system 10 by an individual. It is understood that the work load and stresses exerted upon the spring member 120 is heavy during use of the pumping propulsion system 10. It is also understood that the work load and stresses exerted upon the ratchet mechanisms of the first and second support members 76, 104 is also heavy. The construction of the ratchet mechanisms of the first and second support members 76, 104 and the spring members 120 is therefore sufficient to withstand prolonged exposure to heavy workloads without fracture, fail, and/or breakage.

The pumping propulsion system 10 may be incorporated into an alternate embodiment by affixation of the shaft 28 to the interior of the hub 18, when the hub 18 is the central portion of the rear wheel 13 of a vehicle. In this embodiment, the shaft 28 performs the function as a drive axle for propulsion of the vehicle. The method of affixation of the shaft 28 to the interior of the hub 18 is not critical to the invention so long as the rotation of the shaft 28 within the interior of the hub 18 is not permitted. The method of affixation of the shaft 28 of the interior of the hub 18 may include, but is not limited to, welding and/or mechanical penetrating and receiving members as known in the art. In this embodiment, the necessity of a chain 16 is eliminated; therefore, the freewheel sprocket 58, lock washer 54, first and second screw-in adapters 44, 52 and bearing means 42 are not necessary. The attributes and functions of the shaft 28, first and second support members 76, 104, spring means 102, and pedals 100 remain identical to the preferred embodiment described above. During operation of the alternate embodiment, the pumping action of the first and second legs 84, 108 transfer power to rotate the shaft 28, which via the fixed engagement to the hub 18, rotates the rear wheel 13 for propulsion of the vehicle. In this embodiment, the spring means 102 may be mounted to the vehicle such that the spring members 120 are expanded during pumping of the pedals 100. The spring members 120 then contract to return the pedals 100 to the static and/or stationary preferred starting position. Alternatively, the spring members 120 may be mounted to the vehicle 11 such that the spring members 120 are coiled during pumping of the pedals 100. The spring members then expand to return the pedals 100 to the static and/or stationary preferred starting position. The telescoping tubes 118 and the spring members 120 confine the stroke of the first and second support members 76, 104 during operation of the pumping propulsion system 10.

In an alternate embodiment, the chain 16 is engaged to a drive gear, which is removed from the free wheel sprocket 58 of the pumping propulsion system 10. The drive gear is engaged to an axle which has a plurality of supports. A plurality of paddles are affixed to the supports. Operation of the pumping propulsion system 10 in this embodiment propels a vessel through water.

Figure 7:
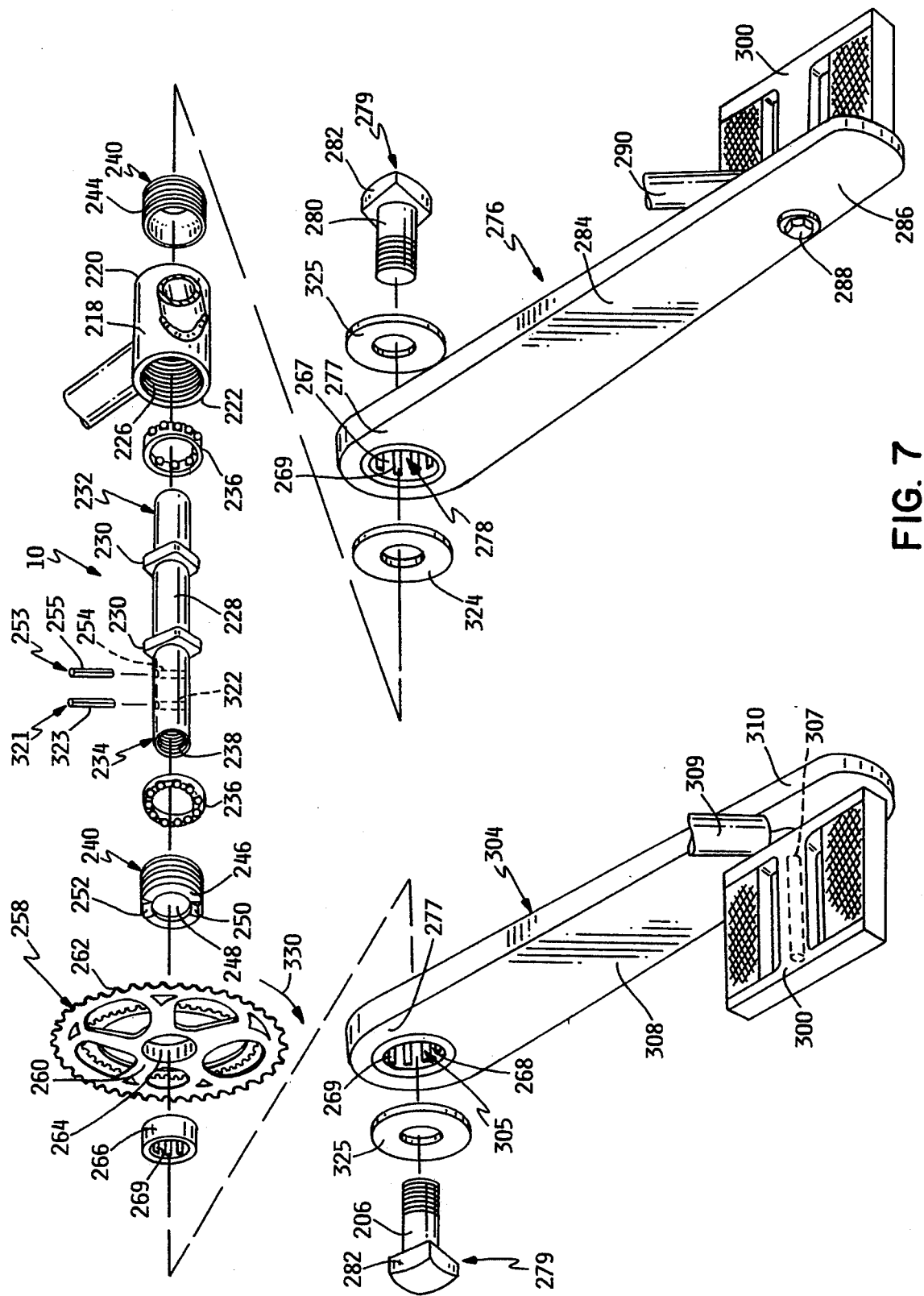

In an alternative embodiment of the invention, the pumping propulsion system 10 is engaged to a hub 218 of a bicycle 11. The hub 218 is generally positioned proximal to the feet of a rider, equal distances between the two wheels of the bicycle 11. The hub 218 is generally integral to the frame 11 and is tubular in shape. The hub 218 has an interior, a first end 220, and a second end 222. The interior of the first end 220 of the hub 218 has a first reverse threaded receiving surface. The interior of the second end 222 of the hub 218 has a first threaded receiving surface 226. In addition, the interior of the hub 218 has a central non-threaded portion located equal distances between the first end 220 and the second end 222. (FIG. 7)

A shaft 228 traverses the interior of the hub 218. The shaft 228 is preferably formed of a solid, sturdy metallic material and is cylindrical in shape. The diameter of the shaft 228 is preferably 9/16 inch. The length of the shaft 228 is preferably six inches. The diameter and length dimensions of the shaft 228 may be varied to satisfy the operational requirements of a vehicle/vessel. The described dimensions are provided for illustrative purposes to show one of the many varied forms which the invention may take. The dimensions for the hub 218 and the shaft 228 may vary considerably provided the essential functions, attributes, and features described herein are not sacrificed. (FIG. 7)

The shaft 228 has a pair of flanges 230 which are preferably square, hexagonal, or octagonal in shape. The flanges 230 are preferably located centrally, equal distances between the first end 232 and the second end 234 of the shaft 228. The flanges 230 are preferably positioned proximal to the central non-threaded portion of the interior of the hub 218. (FIG. 7) Alternatively, the central portion of the shaft 228 may have an increased diameter with respect to the diameter of the first and second ends 232 and 234, respectively. The transition between the larger diameter of the central non-threaded portion and the smaller diameter of the first or second ends 232, 234 may create a ridge eliminating the necessity of the flanges 230.

Figure 9:
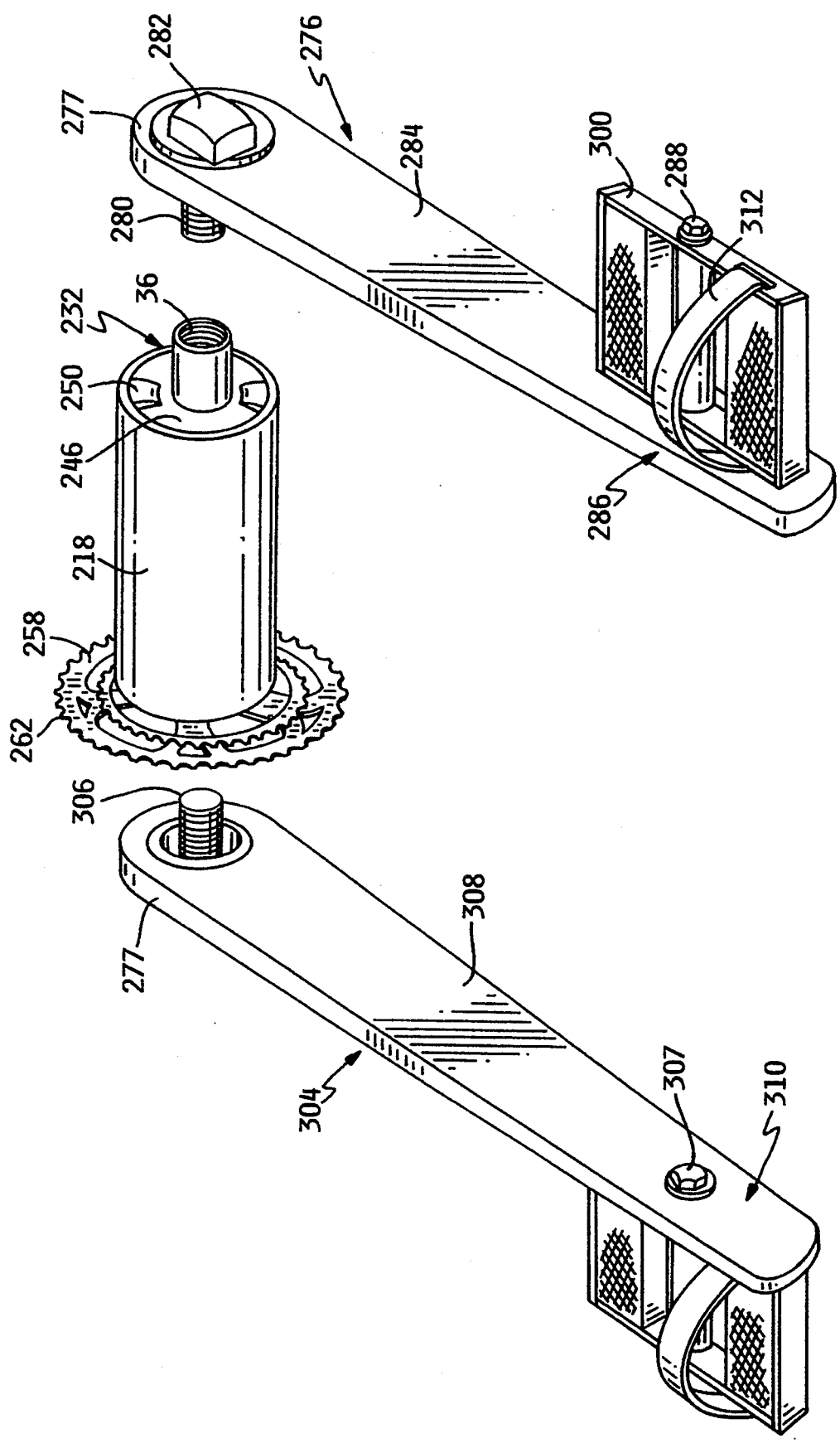

The first end 232 of the shaft 228 has a machined second reverse threaded receiving surface 36. (FIG. 9) The second end 234 of the shaft 228 has a machined second threaded receiving surface 238. The shaft 228 freely rotates within the interior of the hub 218. During the application of power to the pumping propulsion system 10, the direction of rotation, as a reference, shall be indicated herein as a clockwise rotation as apparent from arrow 330 of FIG. 7.

The purpose of the shaft 228 is to provide a portion of the mechanism for the transfer of manual power to a bicycle/vehicle during use of the pumping propulsion system 10. The shaft 228 rotates within the hub 218, transferring power to the chain 16, gears 15, and ultimately to the rear wheel 13 of bicycle/vehicle 11.

The flanges 230 provide an individual with a surface for grasping during the assembly, disassembly, and/or maintenance of the pumping propulsion system 10. An individual, upon grasping of the flanges 230 with a tool, may rotate the shaft 228 in a desired direction. The flanges 230 also function to position the means for facilitating 236 the rotation of the shaft 228 within the interior of the hub 218.

The purpose of the second reverse threaded receiving surface 36 of the first end 232 of the shaft 228 is to engage the penetrating reverse threaded member 280 of the second means for affixation 279. (FIG. 7)

The purpose of the second threaded receiving surface 238 of the second end 234 of the shaft 228 is to engage the penetrating threaded member 306 of the second means for affixation 279. (FIG. 7)

During operation of the pumping propulsion system 10, the first and second support members 276 and 304, respectively, transfer power from the pumping/stepping action of a rider's legs to rotate the shaft 228 in a clockwise direction. Power generated during rotation of the shaft 228 is transferred from the shaft 228 to the sprocket 258, then to the chain 16, gears 15, and ultimately to the rear wheel 13 for propulsion of the bicycle/vehicle 11.

A pair of means for facilitating 236 the rotation of the shaft 228 are engaged to the shaft 228 and the hub 218 of the pumping propulsion system 10. The means for facilitating 236 the rotation of the shaft 228 are preferably circular ball bearing arrangements herein interchangeably identified as numeral 236. Alternatively, the means for facilitating 236 the rotation of the shaft 228 may include recirculating ball bearing arrangements, needle bearings, and/or polyteflon materials. One of the means for facilitating 236 the rotation is positioned between one flange 230 and the first end 232 of the shaft 228. The other means for facilitating 236 the rotation is positioned between the other flange 230 and the second end 234 of the shaft 228. Each circular ball bearing arrangement 236 has a circular housing having a bore and a plurality of ball bearings. The shaft 228 is flushly engaged to, and encircled by, the bore of the circular housing of each of the circular ball bearing arrangements 236. Each of the circular ball bearing arrangements 236 is preferably engaged to the shaft 228 proximal to the flanges 230, and is positioned proximal to the non-threaded portion of the interior of the hub 218. The purpose of the circular ball bearing arrangements 236 is to reduce friction and provide free rotation of the shaft 228 within the interior of the hub 218. (FIG. 7)

The shaft 228 is rotatably engaged within the interior of the hub 218 by the first means for affixing which is indicated in general by the numeral 240. The first means for affixing 240 preferably consists of a first reverse threaded screw-in adapter 244 and second threaded screw-in adapter 252. The first means for affixing 240 may be any means for rotatably engaging the shaft 228 to the hub 218 including but not limited to a cap or plug having an aperture. It should be noted that the first means for affixing 240 may be threaded and sized for either interior engagement to the inside of the hub 218 or for engagement to the exterior of the hub 218 at the preference of an individual. The first reverse threaded screw-in adapter 244 is engaged to the first end 220 of the hub 218. The first reverse threaded screw-in adapter 244 is preferably cylindrical in shape having two ends, a first platform 246 engaged to one end, and a circular aperture 248 passing through the first platform 246. The first platform 246 also contains a pair of tightening members 250. The exterior of the first reverse threaded screw-in adapter 244 is machined for screw-in engagement to the first reverse threaded receiving surface of the first end 220 of the hub 218. The first end 232 of the shaft 228 passes through the circular aperture 248 of the first platform 246. The first reverse threaded screw-in adapter 244 may then be affixed to the first reverse threaded receiving surface of the first end 220 of the hub 218. (FIG. 7)

A purpose of the first reverse threaded screw-in adapter 244 is to confine the circular ball bearing arrangements 236 within the interior of the hub 218. Another purpose of the first reverse threaded screw-in adapter 244 is to confine the circular ball bearing arrangements 236 in an encircling relationship around the shaft 228 in order to reduce friction, and maintain the free rotation of the shaft 228 inside the hub 218. Still another purpose of the first reverse threaded screw-in adapter 244 is to affix the shaft 228 to the hub 218.

A second threaded screw-in adapter 252 is engaged to the second end 222 of the hub 218. The second threaded screw-in adapter 252 is preferably cylindrical in shape having two ends and a first platform 246 engaged to one end, and a circular aperture 248 passing through the first platform 246. The first platform 246 also contains a pair of tightening members 250. The exterior of the second threaded screw-in adapter 252 is machined for screw-in engagement to the first threaded receiving surface 226 of the second end 222 of the hub 218. The second end 234 of the shaft 228 passes through the circular aperture 248 of the first platform 246. The second threaded screw-in adapter 252 may then be affixed to the first threaded receiving surface 226 of the second end 222 of the hub 218 by clockwise rotation of the second threaded screw-in adapter 252 in the direction of the arrow 330 of FIG. 7.

A purpose of the second threaded screw-in adapter 252 is to confine the circular ball bearing arrangements 236 to the interior of the hub 218. Another purpose of the second threaded screw-in adapter 252 is to confine the circular ball bearing arrangements 236 in an encircling relationship around the shaft 228 in order to reduce friction and maintain free rotation of the shaft 228 in the hub 218. Still another purpose of the second threaded screw-in adapter 252 is to affix the shaft 228 to the hub 218.

It should be noted that the first platform 246 of the first reverse threaded screw-in adapter 244 and the second threaded screw-in adapter 252 are positioned to the exterior of the hub 218. The tightening members 250 may then be easily manipulated by an individual, for disassembly, or maintenance of the pumping propulsion system 10. (FIG. 7)

A sprocket 258 having a first drawn cup roller clutch 266 is engaged to the shaft 228 between a flange 230 and the second end 234. The sprocket 258 has a body 260 having a centrally positioned first aperture 264 therethrough. The first aperture 264 centrally passes through the body 260 of the sprocket 258. At least one set of teeth 262 extends radially outwardly from the sprocket 258 as known in the art. A set of teeth 262 engage the bicycle chain 16 during operation of the pumping propulsion system 10. (FIGS. 2 and 7)

A first drawn cup roller clutch 266 mechanism is rigidly machine pressed within, and affixed to, the first aperture 264 of the sprocket 258. The machine pressed pressure seal between the first aperture 264 of the sprocket 258 and the first drawn cup roller clutch 266 establishes a friction relationship preventing slippage or rotation of the first drawn cub roller clutch 266 with respect to the sprocket 258 during use of the pumping propulsion system 10. The first drawn cup roller clutch 266 mechanism of the sprocket 258 rigidly affixes the position of the body 260, and a set of teeth 262, with respect to the shaft 228 during the clockwise rotation of the sprocket 258, when the speed of rotation of the shaft 228 and the set of teeth 262 exceed the speed of rotation of the gears 15 of the rear wheel 13 of a bicycle 11. The first drawn cup roller clutch 266 mechanism provides the free rotation of the sprocket 258, relative to the shaft 228, when the speed of rotation of the gears 15, rear wheel 13, and chain 16 exceed the speed of rotation of the shaft 228.

The sprocket 258 is engaged to the second end 234 of the shaft 228. The first drawn cup roller clutch 266 is preferably slidably engaged over the second end 234 of the shaft 228.

During operation of the pumping propulsion system 10, the shaft 228 is rotated in a clockwise direction due to the rigid engagement of the first drawn cup roller clutch 266 to the shaft 228 and the engagement of the first drawn cup roller clutch 266 to the first aperture 264 of the sprocket 258, so long as the speed of rotation of the shaft 228 exceeds the speed of rotation of the axle for the rear wheel 13. The chain 16 is then rotated in a clockwise direction providing power to the gears 15 for the rotation of the rear wheel 13, propelling the bicycle/vehicle 11 in a forward direction. A bicycle/vehicle 11 may be backed or moved in a rearward direction which causes a counterclockwise rotation of the first, second, and third drawn cup roller clutch mechanisms 266, 267 and 268. The counterclockwise rotation of the first, second, and third drawn cup roller clutch mechanisms 266, 267, and 268 does not cause rotation or movement of the sprocket 258, first support member 276, or second support member 304. The free rotation of the first, second and third drawn cup roller clutch mechanisms 266, 267 and 268 of the sprocket 258, and first and second support members 276 and 304, respectively, permits the counterclockwise rotation of the shaft 28 which in turn permits the counterclockwise rotation of the chain 16 and the rear wheel 13, allowing rearward movement of the bicycle/vehicle 11.

During use of the pumping propulsion system 10, the shaft 228 and the sprocket 258 are rotatable in either a clockwise or counterclockwise direction. The shaft 228 and the sprocket 258 remain in a static or stationary position during the rolling of a bicycle 11 in a forward direction due to the ability of the first, second and third drawn cup roller clutch mechanisms 266, 267 and 268, respectively, to freely rotate in a clockwise direction when the speed of rotation of the axle of the rear wheel 13 exceeds the speed of rotation of the shaft 228.

A purpose of the sprocket 258 and the first drawn cup roller clutch 266 is to provide the mechanism for the transfer of power from the clockwise rotation of the shaft 228 to the bicycle chain 16 for propulsion of the bicycle/vehicle 11. Another purpose of the sprocket 258 and first drawn cup roller clutch 266 is to provide for the free clockwise rotation of a set of teeth 262, bicycle chain 16, gears 15, and/or rear wheel 13, when a bicycle/vehicle 11 is coasting or moved in a forward direction. The sprocket 258 and the first drawn cup roller clutch 266 perform a function of transferring power, via the chain 16, to the rear wheel 13 during the pumping of the pedals 300. Another function of the sprocket 258 and first drawn cup roller clutch 266 is to provide free clockwise rotation of a set of teeth 262 and sprocket 258 when the pedals 300 are at rest.

Figure 8:
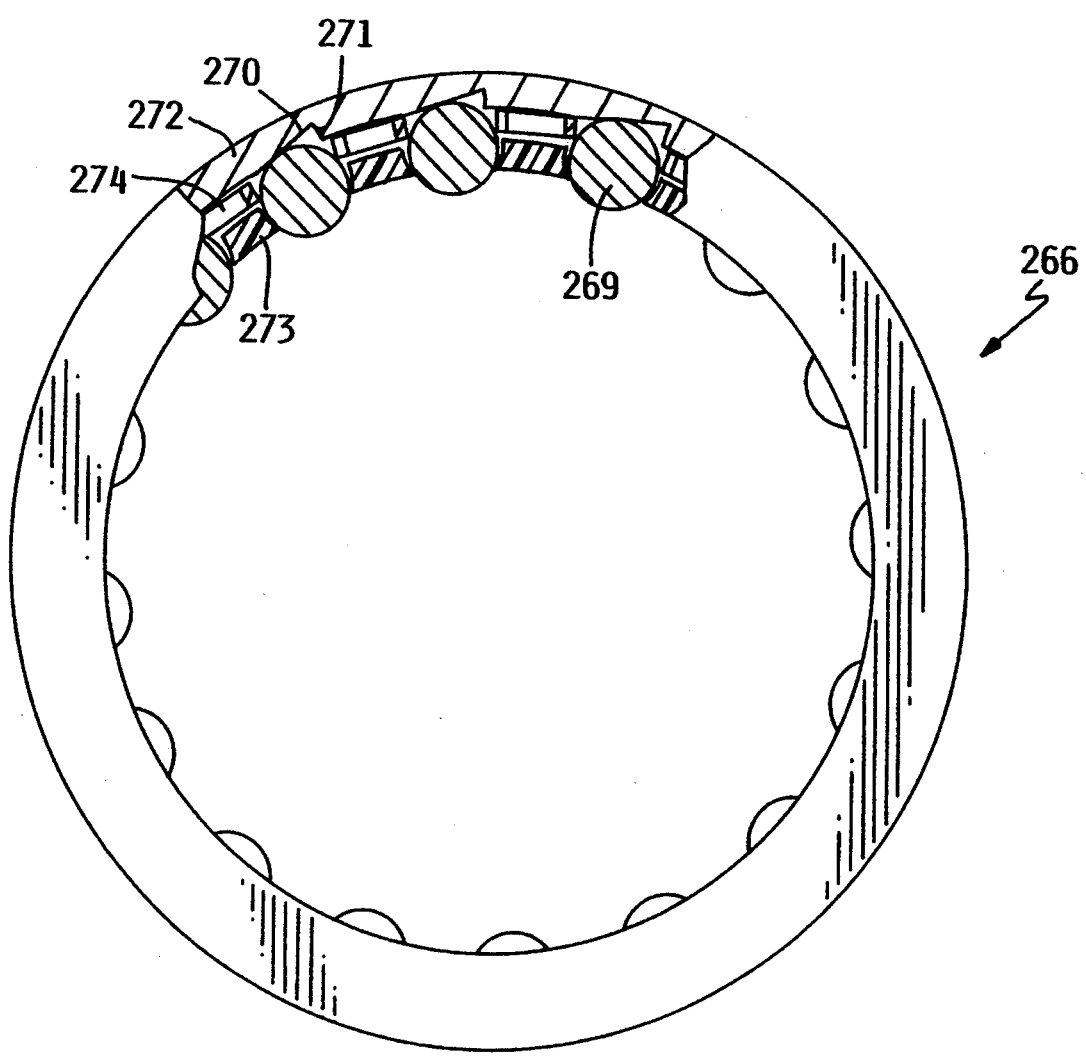

As known in the art, and as described in U.S. Pat. No. 3,942,616 to Elmore, and U.S. Pat. No. 3,588,534 to C. F. Benson et al., each of the first, second, and third drawn cup roller clutch 266, 267 and 268 mechanisms in general include a plurality of rollers 269, a plurality of ramp shaped cam surfaces 270 which may have back stop portions 271, an outer case 272, and at least one retainer plate 273 having a plurality of biasing leaf spring tabs 274. (FIG. 8) The plurality of rollers 269 engage the shaft 228 and the ramp shaped cam surfaces 270 as known in the art. The plurality of rollers 269 are maintained in a desired position inside the outer case 272 by the retainer plate 273 and biasing leaf spring tabs 274. Relative rotation of the shaft 228 and the outer case 272 in a direction such that the rollers 269 are moved down the ramp shaped cam surfaces 270 toward the area of increasing space adjacent the backstop portions 271 will cause the shaft 228 and the outer case 272 to be in the unlocked or overrunning condition in which they can have rotation. Relative rotation of the shaft 228 and outer case 277 in opposite direction such that the rollers 269 tend tot move up the ramp shaped cam surface 270 toward the area of decreasing space between the shaft 228 and the outer case 272 causes the lock up of the shaft 228 and the outer case 272 through wedging of the rolling members 269 between the shaft 228 and the outer case 272 which prevents any further rotation of the shaft 228 with respect to the outer case 272. Each retainers plate 273 includes a plurality of circumferentially spaced biasing leaf spring tabs 274. The spring tabs 274 extend substantially axially toward the opposite end plate of the outer case 272. The leaf springs urge a roller 269 toward a lock up position on the ramp shaped cam surfaces 270 which causes an arrangement permitting a maximum number of rollers for a given size of clutch.

The use of the first, second, and third drawn cup roller clutch 266, 267 and 268 mechanisms substantially improves the smooth operation of the pumping propulsion system 10 during use by an individual. In this embodiment, the first, second, and third drawn cup roller clutch 266, 267 and 268 mechanisms replace the ratchet mechanisms as earlier described.

During operation of the pumping propulsion system 10, the penetrating reverse threaded member 280 is tightly maintained to the first end 232 of the shaft 228. During pumping of the first leg 284, the penetrating reverse threaded member 280 is rotated in a clockwise direction as shown by arrow 330 of FIG. 7. Power applied to the first leg 284 causes the downward movement of the first support member 276. The fixed engagement between the second drawn cup roller clutch 267 and the second aperture 278 causes rotation of the second drawn cup roller clutch 267 in a clockwise direction as indicated by arrow 330 of FIG. 7. The locking engagement of the second drawn cup roller clutch 267 to the shaft 228 causes the clockwise rotation of the shaft 228, which in turn causes the clockwise rotation of the first drawn cup roller clutch 266 and sprocket 258. The teeth 262 of the sprocket 258 then rotate in a clockwise direction driving the chain 16 which transfers power to the gears 15 and rear wheel 13 of the bicycle 11.

The sprocket 258 is separated from the second end 222 of the hub 218 and the second threaded screw-in adapter 252 by a first means for separating which is indicated in general by the numeral 253. The first means for separating 253 preferably consists of a first key way 254 which passes through the shaft 228 proximal, and exterior to, the second end 222 of the hub 218 and the second threaded screw-in adapter 252. A first key 255 is preferably compressed for passing engagement into the first key way 254. The expansion of the first key 255 within the first key way 254 rigidly affixes the first key 255 to the shaft 228 establishing the first means for separating 253. Alternatively, a cotter pin may be substituted for a first key 255 at the discretion of an individual. The purpose of the first means for separating 253 is to fixedly position the sprocket 258 along the shaft 228 exterior to the hub 218. Another purpose of the first means for separating 253 is to prevent movement of the sprocket 258 along the shaft 228 towards the hub 218. The first means for separating 253 thereby prevents engagement between the first drawn cup roller clutch 266 and the second threaded screw-in adapter 252. The free unencumbered rotation of the sprocket 258, first drawn cup roller clutch 266, and the shaft 228 is thereby ensured. It should be noted that the first key 255 does not inhibit or affect the free rotation of the sprocket 258, first drawn cup roller clutch 266, or the shaft 228. Alternatively, flanges and/or washers may be used as the first means for separating 253 in order to prevent contact between the sprocket 258 and the hub 218 and/or the second threaded screw-in adapter 252.

The second support member 304 is separated from the sprocket 258 by a second means of separating which is indicated in general by the numeral 321. The second means of separating 321 consists of a second key way 322 which passes through the shaft 228 proximal to the second end 234 of the hub 218. A second key 323 is preferably compressed for passing engagement into the second key way 322. The expansion of the second key 323 within the second key way 322 rigidly affixes the second key 323 to the shaft 228 establishing the second means for separating 321. Alternatively, a cotter pin may be substituted for the second key 323 at the discretion of an individual. A purpose of the second means for separating 321 is to fixedly position the sprocket 258 between the first key 255 and the second key 323 at a desired position on the shaft 228 proximal to the second end 234, exterior to the hub 218. Another purpose of the second means for separating 321 is to prevent movement of the sprocket 258 along the shaft 228 during engagement of the pumping propulsion system 10. The second means for separating 321, like the first means for separating 253, does not effect or interfere with the rotation of the first drawn cup roller clutch 266 and thereby does not effect the free rotation of the sprocket 258 or the shaft 228. Alternatively, flanges and/or washers may be used as the second means for separating 321 in order to prevent contact between the sprocket 258 and the second support member 304.

The second means for separating 321 also functions to prevent interfering engagement between the third drawn cup roller clutch 268 and the first drawn cup roller clutch 266. The second means for separating 321 thereby ensures the free rotation of the shaft 228, the first drawn cup roller clutch 266, and the third drawn cup roller clutch 268. Another purpose of the second means for separating 321 is to fixedly position the second support member 304 to the second end 234 of the shaft 228 without adversely affecting the free rotation of the third drawn cup roller clutch 268, shaft 228, or first drawn cup roller clutch 266. It should be noted that the second means for separating 321 in conjunction with the penetrating threaded member 306 fixedly positions the second support member 304 to the second end 234 of the shaft 228.

The first support member 276 is positioned proximal to the first end 232 of the shaft 228. The first support member 276 has an engagement portion 277 having a centrally positioned second aperture 278 therethrough, a first leg 284 having a first lower portion 286, a pedal brace 288, and a first spring bracket 290. (FIG. 7) A second drawn cup roller clutch 267 is preferably positioned within, and engaged to, the second aperture 278 of the engagement portion 277 of the first support member 276. The second drawn cup roller clutch 267 is preferably engaged to the second aperture 278 by machine pressing. The machine pressed pressure seal between the second aperture 278 of the first support member 276 and the second drawn cup roller clutch 267 establishes a friction relationship preventing slippage or rotation of the second drawn cup roller clutch 267 with respect to the first support member 276.

The engagement portion 277 is preferably positioned proximal to the first end 220 of the hub 218 and is curved in shape. The purpose of the engagement portion 277 and the second aperture 278 is to fixedly confine the second drawn cup roller clutch 267 within the first support member 276, during operation of the pumping propulsion system 10. The purpose of the second drawn cup roller clutch 267 is to provide intermittent rotation of the shaft 228 in a desired direction. The rollers 269 and ramp shaped cam surfaces 270 permit the second drawn cup roller clutch 267 to freely rotate in one direction only. Rotation in the opposite direction is prevented by the engagement of the rollers 269 to the ramp shaped cam surfaces 270, between the shaft 228 and the outer case 272, which prevent rotation of the second drawn cup roller clutch 267 in the opposite direction.

The second support member 304 is positioned proximal to the second end 234 of the shaft 228. The second support member 304 has an engagement portion 311 having a centrally positioned third aperture 305 therethrough, a second leg 308 having a second lower portion 310, a second peddle brace 307, and a second spring bracket 309. (FIG. 7) A third drawn cup roller clutch 268 is preferably positioned within, and engaged to, the third aperture 305 of the engagement portion 311 of the second support member 304. The third drawn cup roller clutch 268 is preferably engaged to the third aperture 305 by machine pressing. The machine pressed pressure seal between third aperture 305 and the second support member 304 and the third drawn cup roller clutch 268 establishes a friction relationship preventing slippage or rotation of the third drawn cup roller clutch 268 with respect to the second support member 304.

The engagement portion 277 of the second support member 304 is preferably positioned proximal to the second end 222 of the hub 218 and is curved in shape. The general features and purpose of the engagement portion 277, second aperture 305, and the third drawn cup roller clutch 268 of the second support member 304 is identical to the features of the engagement portion 311, second drawn cup roller clutch 267, and first support member 276.

The purpose of the engagement portion 311 and the third aperture 305 of the second support member 304 is to fixedly confine the third drawn cup roller clutch 268 to the second support member 304 during operation of the pumping propulsion system 10. The purpose of the third drawn cup roller clutch 268 is to provide intermittent rotation of the shaft 228 in a desired direction. The rollers 269 and the ramp shaped cam surfaces 270 permit the third drawn cup roller clutch 268 to freely rotate in one direction only. Rotation in the opposite direction is prevented by the engagement of the rollers 269 to the ramp shaped cam surfaces 270 which prevent rotation of the third drawn cup roller clutch 268 in the opposite direction.

In the preferred embodiment, the third drawn cup roller clutch 268 of the second support member 304 permits the sprocket 258 and the shaft 228 to rotate freely in a counterclockwise direction which is opposite to the direction indicated by arrow 330 of FIG. 7. The first, second, and third drawn cup roller clutch 266, 267, 268 mechanisms are prevented from rotation in a clockwise direction due to the engagement of the rollers 269 to the ramp shaped cam surfaces 270 during pumping of the second leg 308 by an individual.

In the preferred embodiment, the first drawn cup roller clutch 266, second drawn cup roller clutch 267, and third drawn cup roller clutch 268 permit the sprocket 258, and the shaft 228, to rotate freely in a counterclockwise direction which is opposite to the direction of rotation indicated by arrow 330 of FIG. 7. The first, second, and third drawn cup roller clutch mechanisms 266, 267, and 268, respectively, are prevented from rotation in a clockwise direction due to the engagement of the rollers 269 to the ramp shaped cam surfaces 270 during the pumping action of the first leg 284 or second leg 308 by an individual. (FIG. 7)

The first leg 284 is integrally formed to and depends from the engagement portion 277 terminating in a first lower portion 286. The first leg 284 is preferably formed of a rigid metallic material of sufficient strength and durability to not fracture, break, or bend during use of the pumping propulsion system 10. The first leg 284 may be of any length and is preferably 12 inches long. The purpose of the first leg 284 is to provide a sturdy, resilient, support which does not bend or fracture when exposed to pumping forces exerted by an individual's legs during operation of the pumping propulsion system 10.

A first pedal brace 288 is affixed to an extends perpendicularly outward from the first lower portion 286 of the first leg 284. The first pedal brace 288 pivotally affixes a pedal 300 to the first leg 284. The purpose of the first pedal brace 288 is to provide for the pivotal engagement of a pedal 300 to the first support member 276.

A first spring bracket 290 is affixed to and extends perpendicularly upward from the first pedal brace 288. The first spring bracket 290 attaches the means for actuating 302 to the first lower portion 286 of the first leg 284 of the first support member 276.

The second leg 308 is integrally formed to and depends from the engagement portion 311 of the second support member 304 terminating in a second lower portion 310. The second leg 308 is preferably formed of a rigid metal material of sufficient strength and durability to not fracture, break, or bend during use of the pumping propulsion system 10. The second leg 308 may be of any length and is preferably 12 inches long. The purpose of the second leg 308 is to provide a sturdy, resilient support which does not bend or fracture when exposed to pumping forces exerted by an individual's legs during operation of the pumping propulsion system 10. (FIG. 7)

A second pedal brace 307 is affixed to and extends perpendicularly outward from the second lower portion 310 of the second leg 308. The second pedal brace 307 pivotally affixes a pedal 300 to the second leg 308. The purpose of the second pedal brace 307 is to provide for the pivotal engagement of a pedal 300 to the second support member 304.

A second spring bracket 309 is affixed to and extends perpendicularly upward from the second pedal brace 307. The second spring bracket 309 attaches the means for actuating 302 to the second lower portion 310 of the second leg 308 of the second support member 304.

A pedal 300 is pivotally affixed and extends outwardly from each of the first and second pedal braces 288, 307 of the first and second legs 284 and 308, respectively. The pedals 300 may be affixed to the first or second pedal braces 288, 307 of the first and second legs 284, 308 by any preferred means including but not limited to bolts and nuts. Each pedal 300 has a toe loop 312 as known the art. Pedals 300 and toe loops 312 provide the area for engagement of an individual's feet during operation of the pumping propulsion system 10.

The first support member 276 and the second support member 304 are preferably affixed to the shaft 228 by the second means for affixing which is indicated in general by the numeral 279. The second means for affixing 279 generally includes a first penetrating reverse threaded member 280 and a first penetrating threaded member 306. The first penetrating reverse threaded member 280 and the first penetrating threaded member 306 each include an engagement nut 282. The first penetrating reverse threaded member 280 is preferably engaged to the second reverse threaded receiving surface 36 of the first end of the shaft 228. The first penetrating threaded member 306 is preferably engaged to the second threaded receiving surface 238 of the second end 234 of the shaft 228. A purpose of the second means for affixing 279 is to confine and attach the second and third drawn cup roller clutch 267, 268 mechanisms of the first and second support members 276, 304 to the shaft 228. It should be noted that the second means for affixing 279 does not interfere and/or affect the rotation of the second drawn cup roller clutch 267, third drawn cup roller clutch 268, and/or shaft 228. Another purpose of the second means for affixing 279 is to prevent the disengagement of the first and second support members 276, 304 from the shaft 228 during operation of the pumping propulsion system 10.

An engagement nut 282 is affixed to and extends from the penetrating reverse threaded member 280. The second means for affixing 279 attaches the first support member 276 to the shaft 228 where the engagement nut 282 is preferably centrally positioned to the exterior of the engagement portion 277 of the first support member 276. The engagement nut 282 may be square, hexagonal or octagonal in shape. The purpose of the engagement nut 282 is to provide an individual with a location for grasping of the penetrating reverse threaded member 280 during assembly, disassembly, and/or maintenance of the pumping propulsion system 10. (FIG. 7)

The penetrating reverse threaded member 280 preferably extends from the exterior of the first support member 276 through the second drawn cup roller clutch 267 into the second reverse threaded receiving surface 36 of the shaft 28. The penetrating reverse threaded member 280 is an integral portion of the pumping propulsion system 10 affixing the first support member 276 to the shaft 228. The exterior surface of the entire penetrating reverse threaded member 280 is preferably machined forming a continuous groove adapted for engagement to the second reverse threaded receiving surface 36 of the first end 232 of the shaft 228. The penetrating reverse threaded member 280 is preferably rotated into the second reverse threaded receiving surface 36 until a tight engagement has occurred, where the engagement portion 277 is positioned proximal to the first end 232 of the shaft 228. (FIG. 7)

The penetrating threaded member 306 preferably extends from the exterior of the second support member 304 through the third drawn cup roller clutch 268 into the second threaded receiving surface 238 of the shaft 228. The penetrating threaded member 306 is an integral portion of the pumping propulsion system 10 affixing the second support member 304 to the shaft 228. The exterior surface of the entire penetrating threaded member 306 is preferably machined forming a continuous groove adapted for engagement to the second interior threaded receiving surface 238 of the second end 234 of the shaft 228. The penetrating threaded member 306 is preferably rotated into the second interior threaded receiving surface 238 until a tight engagement has occurred, where the engagement portion 311 is positioned proximal to the second end 234 of the shaft 228.

The engagement nut 282 of the second support member 304 may be square, hexagonal, or octagonal in shape. The purpose of the engagement nut 282 is to provide an individual with a location for grasping of the second support member 304 during assembly, disassembly, and/or maintenance of the pumping propulsion system 10. (FIG. 7)

The first support member 276 is separated from the hub 218 by a third means for separating indicated by numeral 324. The third means for separating 324 is preferably a washer which hereinafter is indicated interchangeably with the numeral 324 of the third means for separating. The third means for separating 324 preferably contains an aperture which preferably encircles the first end 232 of the shaft 228. The third means for separating is preferably positioned between the first reverse threaded screw-in adapter 244, positioned within the first end 220 of the hub 218, and the second drawn cup roller clutch 267 which is affixed to the first support member 276. The third means for separating 324 preferably prevents interfering engagement between the second drawn cup roller clutch 267 and the first reverse threaded screw-in adapter 244. A purpose of the third means for separating 324 is to ensure the free rotation of the second drawn cup roller clutch 267 and the shaft 228. Alternatively, the third means for separating 324 may consist of a third key way and key at the discretion of an individual. Alternatively, an individual may elect to use a flange or a cotter pin for use with a third key way. Another purpose of the third means for separating 324 is to fixedly position the first support member 276 to the first end 232 of the shaft 228 without adversely affecting the free rotation of the second drawn cup roller clutch 267 or the shaft 228. It should be noted that third means for separating 324 in conjunction with the penetrating reverse threaded member 280 fixedly positions the first support member 276 to the first end 232 of the shaft 228.

The first penetrating reverse threaded member 280 is preferably separated from the second drawn roller clutch 267 of the first support member 276 by the fourth means for separating indicated by the numeral 325. The fourth means for separating 325 is preferably a washer having an aperture for receiving engagement of the first penetrating reverse threaded member 280 which is ultimately engaged to the second reverse threaded receiving surface 36 of the shaft 228. The aperture of the fourth means for separating 325 is preferably positioned for engagement to both the first end 232 of the shaft 228 and the first penetrating reverse threaded member 280, and is located between the second drawn cup roller clutch 267 and the engagement nut 282. The fourth means for separating 325 thereby facilitates the free rotation of the second drawn cup roller clutch 267, first support member 276, and the shaft 228 by eliminating interference which may result upon the tightening engagement of the first penetrating reverse threaded member 280 to the second reverse threaded receiving surface 36 of the first end of the shaft 228. The fourth means for separating 325 may be of any preferred means selected by an individual including cotter pins or flanges provided that the essential features, functions, and attributes described herein are not sacrificed.

The second penetrating threaded member 306 is preferably separated from the third drawn cup roller clutch 268 of the second support member 304 by another fourth means for separating 325. The fourth means for separating 325 is preferably a washer having an aperture for receiving engagement of the first penetrating threaded member 306 which is ultimately engaged to the second threaded receiving surface 238 of the shaft 228. The aperture of the fourth means for separating 325 is preferably positioned for engagement to both the second end 234 of the shaft 228 and the first penetrating threaded member 306 and is located between the third drawn cup roller clutch 268 and the engagement nut 282. The fourth means for separating 325 thereby facilitates the free rotation of the third drawn cup roller clutch 268, second support member 304, and the shaft 228 by eliminating interference which may result upon the tightening engagement of the first penetrating threaded member 306 to the second threaded receiving surface 238 of the second end 234 of the shaft 228.

The means for actuating 302 is preferably engaged to the first and second spring brackets 290 and 309. In general, the means for actuating 302 includes a second platform 314 affixed to the frame 12 of the bicycle/vehicle 11, a pivot means 316 affixed to the second platform 314, a pair of telescoping tubes 318, and a spring member 320 within each of the telescoping tubes 318.

The second platform 314 preferably and extends upward from the frame 12 of the bicycle/vehicle 11. The second platform 314 may be any preferred aesthetically pleasing shape including but not limited to a straight bar, inverted V-shape, and/or inverted U-shape. The second platform 314 may be affixed to the frame 12 by any preferred means including but not limited to welding, rivets, nuts and bolts, and/or glue at the preference of an individual.

A pivot means 316 is preferably engaged to the upper portion of the second platform 314. The pivot means 316 is preferably a bolt and nut mechanism which permits movement of the position of the telescoping tubes 318 during operation of the pumping propulsion system 10.

Each of the pair of telescoping tubes 318 holds a spring member 320. One of the pair of telescoping tubes 318 is affixed to one side of the second platform 314 and to the corresponding first spring bracket 290 of the first support member 276. The other telescoping tube 318 is affixed to the opposite side of the second platform 314 and is affixed to the corresponding spring bracket 309 of the second support member 304. The spring members 320 are affixed to the telescoping tube members 318 proximal to the pivot means 316 and proximal to the first and second spring brackets 290, 309.

The purpose of the second platform 314 is to provide an upper support for the means for actuating 302. The purpose of the pivot means 306 is to provide for the adjustable positioning of the pair of telescoping tubes 318 during operation of pumping propulsion system 10. The purpose of the pair of telescoping tubes 318 is to confine and protect the spring members 320 during operation of the pumping propulsion system 10. The purpose of the spring members 320 is to return the pedals 300 and the first and second support members to 276, 304 to a static elevated position upon removal of pumping force by an individual. (FIG. 1)

Alternatively, the means for actuating 302 may include a guide tube which replaces the pair of tubes 318 and an elastic cord member which replaces the spring members 320. The guide tube would be affixed to the second platform 314. The elastic cord member would be affixed to each of the first and second spring brackets 290, 309 and to the guide tube. It should be noted that any means for actuating 302 may be used at the preference of an individual which return the first and second support members to 276 and 304, including the pedals 300, to an elevated and static position proximal to the second platform 314.

A purpose of the means for actuating 302 is to define a range of stepping motion for the first and second support members 276 and 304 and an individual's legs during operation of the pumping propulsion system 10. Initially, a horizontal axis of symmetry is defined by the shaft 228 extending through the hub 218. The range of motion for the first and second support members 276, 304, above and below the horizontal axis of symmetry, does not exceed 85°. It should therefore be noted that the range of motion for the pedals 300 is not circular but is substantially vertical and arcuate, thereby duplicating the range of motion of an individual's legs during the climbing of a set of stairs. The stepping action of an individual's legs powers the pumping propulsion system 10. The means for actuating 302 functions to return or retract either of the first or second support members 276, 304 to an elevated position upon the removal of a downward stepping force by an individual. Repetitive engagement of the pumping propulsion system 10 may then occur for the powering of a bicycle/vehicle 11.

Preferably the spring members 320 are of sufficient strength and durability to not fracture and/or stretch during the use of the pumping propulsion system 10 by an individual. It is understood that the work load and stress exerted upon the spring members 320 is heavy during use of the pumping propulsion system 10. It is also understood that the work load and stresses exerted upon the first, second and third drawn cup roller clutch mechanisms 266, 267 and 268, respectively, of the sprocket 258, and first and second support members 276, 304 is also heavy. The construction of the first, second and third drawn cup roller clutch mechanisms 266, 267 and 268 of the sprocket 258, first and second support members 276, 304 and spring members 320 is therefore sufficient to withstand prolonged exposure to heavy workloads without fracture, failure and/or breakage.

During operation of the pumping propulsion system 10, the penetrating threaded member 306 is tightly affixed to the second end 234 of the shaft 228. During pumping of the second leg 308, the penetrating threaded member 306 is rotated in a clockwise direction as shown by arrow 330 of FIG. 7. Power applied to the second leg 308 causes the downward movement of the second support member 304. The fixed engagement between the third drawn cup roller clutch 268 to the third aperture 305 causes the rotation of the third drawn cup roller clutch 268 in a clockwise direction as indicated by arrow 330 of FIG. 7. The locking engagement of the third drawn cup roller clutch 268 to the shaft 228 causes the clockwise rotation of the shaft 228 which in turn causes the clockwise rotation of the first drawn cup roller clutch 266 and sprocket 258. The teeth 262 of the sprocket 258 then rotate in a clockwise direction, driving the chain 16 which applies power to the gears 15 and rear wheel 13 of the bicycle 11.

The first, second and third drawn cup roller clutch mechanisms 266, 267 and 268, respectively, of the sprocket 58, and first and second support members 276, 304 provide independent action between the first and second legs 284, 308. An individual may use a single leg to drive the pumping propulsion system 10 or the individual may use any combination of both legs to power a bicycle/vehicle 11. During operation, the first and second legs 284, 308 depend from a position proximal to the platform 314 to a position substantially horizontal to the hub 218. Further downward extension of the first and second legs 284, 308 is not possible due to the full expansion of the telescoping tubes 318 and the spring 320. The telescoping tubes 318 and spring members 320 may provide additional range of downward stroke to the legs at the preference of an individual provided that the range of motion does not extend beyond an axis which is perpendicular to the horizontal axis of symmetry defined by the shaft 28. The purpose of the pumping propulsion system 10 is to provide to an individual an alternative stepping-type action for an individual's legs as opposed to the circular action for propelling a bicycle 11 as known in the art. The pumping propulsion system 10 significantly reduces the stress forces exerted upon an individual's knees, thereby significantly improving the utility of a bicycle/vehicle 11 to an individual.

The pumping propulsion system 10 may be incorporated into an alternate embodiment by affixation of the shaft 228 to the interior of the hub 218, when the hub 218 is the central portion of the rear wheel 13 of a vehicle. In this embodiment, the shaft 228 performs the function as a drive axle for propulsion of the vehicle. The method of affixation of the shaft 228 to the interior of the hub 218 is not critical to the invention so long as the rotation of the shaft 228 within the interior of the hub 218 is not permitted. The method of affixation of the shaft 228 to the interior of the hub 218 may include, but is not limited to, welding and/or mechanical penetrating and receiving members as is known in the art. In this embodiment, the necessity of a chain 16 is eliminated; therefore, the sprocket 258, first and second screw-in adapters 244, 252, and the first drawn cup roller clutch 266 may be eliminated. The attributes and functions of the shaft 228, first and second support members 276 304, spring means 302, and pedals 300 remain identical to the preferred embodiment described above. During operation of the alternate embodiment, the pumping action of the first and second legs 284, 308 transfers power to rotate the shaft 228 which, via the fixed engagement to the hub 218, rotates the rear wheel 13 for propulsion of the vehicle. In this embodiment, the spring means 302 may be mounted to the vehicle such that the spring members 320 are expanded during pumping of the pedals. The spring members 320 then contract to return the pedals 300 to the static and/or stationary preferred starting position. Alternatively, the spring members may be mounted to the vehicle 11 such that the spring members 320 are coiled during pumping of the pedals 300. The spring members 320 then expand to return the pedals 300 the static and/or stationary preferred starting position. The telescoping tubes 318 and the spring members 320 confine the stroke of the first and second support members 176, 304 during operation of the pumping propulsion system 10.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A combination pumping propulsion system and bicycle, said bicycle having a frame, said combination comprising:
    (a) a hub having an interior, said hub being integral to said frame of said bicycle;
    (b) a shaft positioned inside said hub, said shaft having a first end and a second end;
    (c) a means for facilitating the rotation of said shaft within said interior of said hub;
    (d) a first means for affixing said shaft to said hub, said first means for affixing further confining said means for facilitating within said interior of said hub;
    (e) a sprocket having a first aperture therethrough positioned proximal to said second end of said shaft;
    (f) a first support member having a first engagement portion having a centrally positioned second aperture therethrough, a first pedal brace, and a first pedal rotatably affixed to said first pedal brace;
    (g) a second support member having a second engagement portion having a centrally positioned third aperture therethrough, a second pedal brace, and a second pedal rotatably affixed to said second pedal brace;
    (h) a means for actuating affixed to said frame of said bicycle, said means for actuating being further attached to said first support member and said second support member for elevating said first support member and said second support member to a position proximal to said frame;
    (i) a first drawn cup roller clutch engaged to said first aperture of said sprocket, said first drawn cup roller clutch having an interior engaged to said second end of said shaft, a second drawn cup roller clutch engaged to said second aperture of said first support member, said second drawn cup roller clutch having an interior engaged to said first end of said shaft, and a third drawn cup roller clutch engaged to said third aperture of said second support member, said third drawn cup roller clutch having an interior engaged to said second end of said shaft; and
    (j) a second means for affixing said first support member and said second support member to said shaft.

2. The combination pumping propulsion system and bicycle according to claim 1, wherein said hub further comprises a first end having a first reverse threaded receiving surface, and a second end having a first threaded receiving surface.

3. The combination pumping propulsion system and bicycle according to claim 2, wherein said first means for affixing further comprises a first reverse threaded screw-in adapter having a first aperture therethrough wherein said first reverse threaded screw-in adapter is engaged to said first reverse threaded receiving surface of said first end of said hub, and a second threaded screw-in adapter having a second aperture therethrough where said second threaded screw-in adapter is engaged to said second threaded receiving surface of said second end of said hub, where said first end of said shaft passes through said first aperture and said second end of said shaft passes through said second aperture.

4. The combination pumping propulsion system and bicycle according to claim 3, wherein said first reverse threaded screw-in adapter and said second threaded screw-in adapter each further comprise a second platform having a pair of tightening members.

5. The combination pumping propulsion system and bicycle according to claim 1, wherein said shaft further comprises a pair of flanges disposed inside said hub, a second reversed threaded receiving surface integral to said first end of said shaft, and a second threaded receiving surface integral to said second end of said shaft, said shaft further having free rotation within said hub.

6. The combination pumping propulsion system and bicycle according to claim 5, wherein said means for facilitating further comprises a pair of circular ball bearing arrangements which are engaged to said interior of said hub and to said shaft providing for free rotation of said shaft within said hub.

7. The combination pumping propulsion system and bicycle according to claim 6, wherein each of said circular ball bearing arrangements is positioned proximal to one of said flanges.

8. The combination pumping propulsion system and bicycle according to claim 5, wherein said second means for affixing comprises a first reverse threaded bolt for penetrating engagement into said second reverse threaded receiving surface of said shaft, and a first threaded bolt for penetrating engagement into said second threaded receiving surface of said shaft.

9. The combination pumping propulsion system and bicycle according to claim 6, wherein one of said ball bearing arrangements is engaged to said shaft between said first end and one of said flanges and said other ball bearing arrangement is engaged to said shaft between said second end and said other flange.

10. The combination pumping propulsion system and bicycle according to claim 9, wherein each of said ball bearing arrangements further comprise a circular bore flushly engaged to and encircling said shaft.

11. The combination pumping propulsion system and bicycle according to claim 1, further comprising: a first key engaged to said shaft on one side of said sprocket and a second key engaged to said shaft on said other side of said sprocket for separating said second support member from said sprocket.

12. The combination pumping propulsion system and bicycle according to claim 11, further comprising a washer encircling said shaft between said second means for affixing and said first support member and another washer encircling said shaft between said second support member and said second means for affixing.

13. The combination pumping propulsion system and bicycle according to claim 1, wherein said first support member depends from said first engagement portion, and said first pedal brace extends outwardly from said first support member.

14. The combination pumping propulsion system and bicycle according to claim 13, wherein said first support member has a first lower portion wherein said first pedal brace extends outwardly perpendicular from said first lower portion.

15. The combination pumping propulsion system and bicycle according to claim 14, further comprising: a first spring bracket affixed to and extending upwardly perpendicular from said first lower portion.

16. The combination pumping propulsion system and bicycle according to claim 15, wherein said means for actuating is affixed to said first spring bracket.

17. The combination pumping propulsion system and bicycle according to claim 1, wherein said second support member depends from said second engagement portion, and said second pedal brace extends outwardly from said second support member.

18. The combination pumping propulsion system and bicycle according to claim 17, wherein said second support member has a second lower portion wherein said second pedal brace extends outwardly perpendicular from said second lower portion.

19. The combination pumping propulsion system and bicycle according to claim 18, further comprising: a second spring bracket affixed to and extending upwardly perpendicular from said second lower portion.

20. The combination pumping propulsion system and bicycle according to claim 19, wherein said means for actuating is affixed to said second spring bracket.

21. The combination pumping propulsion system and bicycle according to claim 1, wherein said means for actuating comprises a platform affixed to said frame, a pair of spring tubes holding spring members pivotally attached to said platform, said first support member, and said second support member for defining an independent and set motion for said first pedal and said second pedal.

* * * * *

UNITED STATES PATENT AND TRADEMARK OFFICE
AMENDED CERTIFICATE OF CORRECTION

PATENT NO.  : 5,351,575
DATED       : October 4, 1994
INVENTOR(S) : Nathan Overby It is certified that error appears in the above-identified patent and that said Letters Patent is hereby corrected as shown below:

Column 1, line 59, please delete the word "still" and insert in its place --Still--.

Column 2, line 27, please delete the word "ms" and insert in its place --is--.

Column 2, line 50, please delete the word "Lock" and insert in its place --lock--.

Column 9, line 39, please delete the word "ond." and insert in its place --ond--.

Signed and Sealed this

Second Day of July, 1996

Attest:

BRUCE LEHMAN

Attesting Officer

Commissioner of Patents and Trademarks